United States Patent
Zhan et al.

(10) Patent No.: US 11,826,721 B2
(45) Date of Patent: Nov. 28, 2023

(54) METAL NANOPARTICLE-DEPOSITED, NITROGEN-DOPED CARBON ADSORBENTS FOR REMOVAL OF SULFUR IMPURITIES IN FUELS

(71) Applicants: Chevron U.S.A. Inc., San Ramon, CA (US); Triad National Security, LLC, Los Alamos, NM (US)

(72) Inventors: Bi-Zeng Zhan, Albany, CA (US); Zunqing He, San Rafael, CA (US); Hoon Taek Chung, Los Alamos, NM (US); Piotr Zelenay, Los Alamos, NM (US)

(73) Assignees: CHEVRON U.S.A. INC., San Ramon, CA (US); TRIAD NATIONAL SECURITY, LLC, Los Alamos, NM (US)

( * ) Notice: Subject to any disclaimer, the term of this patent is extended or adjusted under 35 U.S.C. 154(b) by 0 days.

(21) Appl. No.: 17/533,838

(22) Filed: Nov. 23, 2021

(65) Prior Publication Data

US 2022/0080382 A1 Mar. 17, 2022

Related U.S. Application Data

(62) Division of application No. 16/285,764, filed on Feb. 26, 2019, now abandoned.

(Continued)

(51) Int. Cl.
*B01J 20/02* (2006.01)
*B01J 20/20* (2006.01)
(Continued)

(52) U.S. Cl.
CPC ........... *B01J 20/20* (2013.01); *B01J 20/0233* (2013.01); *B01J 20/28007* (2013.01);
(Continued)

(58) Field of Classification Search
CPC .. B01J 20/0233; B01J 20/20; B01J 20/28007; C10G 25/003
See application file for complete search history.

(56) References Cited

U.S. PATENT DOCUMENTS 7,556,872 B2 * 7/2009 Takatsu .............. B01J 20/28004
423/652
8,518,608 B2 8/2013 Wu et al.
(Continued)

FOREIGN PATENT DOCUMENTS

CN 106914265 A 4/2017
JP 4267483 B2 * 5/2009 ............ B01J 20/041
(Continued)

OTHER PUBLICATIONS

Liu et al. (Adsorption/oxidation of sulfur-containing gases on nitrogen-doped activated carbon, MATEC Web of Conferences 63, 01033 (2016)).*
(Continued)

*Primary Examiner* — Jun Li
(74) *Attorney, Agent, or Firm* — King & Spalding LLP

(57) ABSTRACT

Metal nanoparticle-deposited, nitrogen-doped carbon adsorbents are disclosed, along with methods of removing sulfur compounds from a hydrocarbon feed stream using these adsorbents.

11 Claims, 4 Drawing Sheets

Equilibrium sulfur removal percentages ($R_{equi.}$) for Samples S and U.

Related U.S. Application Data

(60) Provisional application No. 62/635,482, filed on Feb. 26, 2018.

(51) Int. Cl.

| | | |
|---|---|---|
| *B01J 20/28* | (2006.01) | |
| *B01J 20/30* | (2006.01) | |
| *B01J 20/32* | (2006.01) | |
| *C10G 25/00* | (2006.01) | |

(52) U.S. Cl.
CPC ....... *B01J 20/3078* (2013.01); *B01J 20/3204* (2013.01); *B01J 20/3236* (2013.01); *B01J 20/3295* (2013.01); *C10G 25/003* (2013.01); *C10G 2300/1025* (2013.01); *C10G 2300/1051* (2013.01); *C10G 2300/1055* (2013.01); *C10G 2300/202* (2013.01); *C10G 2300/207* (2013.01); *C10G 2300/80* (2013.01)

(56) References Cited

U.S. PATENT DOCUMENTS

| | | |
|---|---|---|
| 2010/0294698 A1 | 11/2010 | E Mello et al. |
| 2012/0070764 A1 | 3/2012 | Chung et al. |
| 2012/0088187 A1 | 4/2012 | Wu et al. |
| 2012/0232863 A1 | 9/2012 | Bell et al. |
| 2013/0048919 A1 | 2/2013 | Chung et al. |
| 2014/0024521 A1 | 1/2014 | Zelenay et al. |
| 2014/0045098 A1 | 2/2014 | Chung et al. |
| 2014/0113811 A1 | 4/2014 | Stadie et al. |
| 2017/0014780 A1 | 1/2017 | Birss et al. |
| 2017/0121611 A1* | 5/2017 | Khaled .................. C10G 67/06 |

FOREIGN PATENT DOCUMENTS

| | | | | |
|---|---|---|---|---|
| JP | WO2009113445 A1 * | 11/2011 | ............. | B01J 20/02 |
| WO | WO-2016136970 A1 * | 9/2016 | ............. | B01D 15/00 |

OTHER PUBLICATIONS

Jiang (Promoting the Electrochemical Performance by Chemical Depositing of Gold Nanoparticles in-side Pores of 3D Nitrogen-doped Carbon Nanocages, ACS applied materials and interfaces, 2017, 9, p. 31968-31976).

Mutyala (Synthesis of nitrogen doped carbon and its enhanced electrochemical activity towards ascorbic acid electrooxidation, International Journal of Electrochemistry, vol. 2014, Jun. 26, 2014, Article ID 26746).

Jiang (Selective Attachment of Gold Nanoparticles to Nitrogen-doped Carbon, Nano Letters, vol. 3 No. 3, Mar. 2003).

Machine translation of CN106914265B, publication date Dec. 13, 2019.

* cited by examiner

Figure 1
Summary of Synthesis Conditions and Desulfurization Capacity for Adsorbents

| Synthesis conditions | PANI-based Carbon Adsorbents | | | | | | |
|---|---|---|---|---|---|---|---|
| | Sample A | Sample B | Sample C | Sample E | Sample F | Sample G |
| Solvent | 2.0 M HCl solution 500 ml | 2.0 M HCl solution 500 ml | 2.0 M HCl solution 500 ml | 2.0 M HCl solution 500 ml | 2.0 M HCl solution 500 ml | 2.0 M HCl solution 500 ml |
| Nitrogen precursor | Aniline 2.5 mL | Aniline 2.5 mL | Aniline 2.5 mL | Aniline 2.5 mL | Aniline 2.5 mL | Aniline 2.5 mL |
| Metal precursor | $FeCl_3$ 10.0 g | $FeCl_3$ 10.0 g | $FeCl_3$ 10.0 g | $FeCl_3$ 0.0 g | $FeCl_3$ 10.0 g | $FeCl_3$ 10.0 g |
| Oxidant | APS 5.0 g | APS 5.0 g | APS 5.0 g | 30% $H_2O_2$ 6 ml | APS 5.0 g | APS 5.0 g |
| Carbon support | K.J. 0.4 g | K.J. 0.4 g | K.J. 0.4 g | K.J. 0.4 g | K.J. 0.4 g | K.J. 0.4 g |
| 1$^{st}$ heat-treatment | 900 °C / 1 h | 800 °C / 1 h | 700 °C / 1 h | 700 °C / 1 h | 750 °C / 1 h | 850 °C / 1 h |
| Acid leaching | 0.5 M $H_2SO_4$; 8 hours; at 80 °C | 0.5 M $H_2SO_4$; 8 hours; at 80 °C | 0.5 M $H_2SO_4$; 8 hours; at 80 °C | 0.5 M $H_2SO_4$; 8 hours; at 80 °C | 0.5 M $H_2SO_4$; 8 hours; at 80 °C | 0.5 M $H_2SO_4$; 8 hours; at 80 °C |
| 2$^{nd}$ heat-treatment | 600 °C / 30 minutes | 600 °C / 30 minutes | 600 °C / 30 minutes | 600 °C / 30 minutes | 600 °C / 30 minutes | 600 °C / 30 minutes |
| $C_{dyn, DMDBT}$, wt% | 0.060 | 0.036 | 0.073 | 0.011 | 0.061 | 0.060 |
| $C_{dyn, DMDBT}$, wt% | 0.083 | 0.067 | 0.080 | 0.024 | 0.073 | 0.073 |
| $R_{equi, DMDBT}$, % | 9.9 | 19.8 | 25.5 | 10.0 | 24.6 | 21.6 |
| $R_{equi, DMDBT}$, % | 14.6 | 29.1 | 17.2 | 19.1 | 32.6 | 30.5 |

Figure 2
Summary of Synthesis Conditions and Desulfurization Capacity for Adsorbents

| Synthesis conditions | (PANI + PAM)-based Carbon Adsorbents | | | | | | |
|---|---|---|---|---|---|---|---|
|  | Sample D | Sample H | Sample I | Sample J | Sample L | Sample M | Sample N |
| Solvent | 2.0 M HCl solution 500 mL | 2.0 M HCl solution 500 mL | 2.0 M HCl solution 500 mL | 2.0 M HCl solution 500 mL | Au deposition was done on Sample J with a reducing agent sodium borohydride (NaBH$_4$) to make 1 wt% Au on nitrogen-doped carbon. | WV-B-1500 was modified by ammonia (NH$_3$) at 900 °C for 20 minutes. | WV-B-1500 was modified by 3.0 M HNO$_3$ at 80 °C for 8 hours and ammonia (NH$_3$) at 900 °C for 20 minutes. |
| Nitrogen precursor | Aniline 3.0 mL; cyanamide 7.0 g | Aniline 3.0 mL; cyanamide 7.0 g | Aniline 3.0 mL; cyanamide 7.0 g | Aniline 3.0 mL; cyanamide 7.0 g |  |  |  |
| Metal precursor | FeCl$_3$ 10.0 g | NiCl$_2$·6H$_2$O 14.7 g | NiCl$_2$·6H$_2$O 14.7 g | FeCl$_3$ 0.0 g |  |  |  |
| Oxidant | APS 5.0 g | APS 5.0 g | APS 5.0 g | APS 5.0 g |  |  |  |
| Carbon support | K.I. 0.4 g | K.I. 0.4 g | K.I. 0.4 g | K.I. 0.4 g |  |  |  |
| 1st heat-treatment | 900 °C / 1 h | 900 °C / 1 h | 900 °C / 1 h | 800 °C / 0.5 h |  |  |  |
| Acid leaching | 0.5 M H$_2$SO$_4$; 8 hours; at 80 °C | 0.5 M H$_2$SO$_4$; 8 hours; at 80 °C | 3.0 M HNO$_3$; 8 hours; at 80 °C | 0.5 M H$_2$SO$_4$; 8 hours; at 80 °C |  |  |  |
| 2nd heat-treatment | 600 °C / 30 minutes | 600 °C / 30 minutes | 600 °C / 30 minutes | 500 °C / 30 minutes |  |  |  |
| $C_{dyn, DM087}$ wt% | 0.058 | 0 | 0.041 | 0.071 | 0.074 | N/A | N/A |
| $C_{dyn, DM4087}$ wt% | 0.079 | 0 | 0.053 | 0.115 | 0.114 | N/A | N/A |
| $R_{equi, DM087}$ % | 19.8 | 14.9 | 24.1 | 29.4 | 17.0 | 15.0 | 9.0 |
| $R_{equi, DM4087}$ % | 29.1 | 21.4 | 28.9 | 51.4 | 32.0 | 31.0 | 4.0 |

Figure 3
Summary of Synthesis Conditions and Desulfurization Capacity for Adsorbents

| Synthesis conditions | (PANI + PANI)-based Carbon Adsorbents | | |
| --- | --- | --- | --- |
| | Sample P | Sample S | Sample U |
| Solvent | 2.0 M HCl solution 500 ml | 2.0 M HCl solution 500 ml | 1 wt% Au deposition on Sample S): 2.9 g of Sample S was sonicated in 500 ml DI water for 1 hour, and separately 0.0586 g of $HAuCl_4 \cdot 3H_2O$ was dissolved in 100 ml DI water. The carbon dispersion and the $HAuCl_4 \cdot 3H_2O$ solutions were mixed and stirred for 15 hours. Then the mixture was filtered using a 0.45 micrometer membrane filter and dried in a vacuum oven at 90 °C overnight. |
| Nitrogen precursor | Aniline 3.0 mL; cyanamide 7.0 g | Aniline 3.0 mL; cyanamide 7.0 g | |
| Metal precursor | $FeCl_3$ 0.0 g | $FeCl_3$ 10.0 g | |
| Oxidant | APS 5.0 g | APS 5.0 g | |
| Carbon support | No support | MWV 295-R-03 | |
| 1st heat-treatment | 800 °C / 0.5 h | 800 °C / 0.5 h | |
| Acid leaching | 0.5 M $H_2SO_4$; 8 hours; at 80 °C | 0.5 M $H_2SO_4$; 8 hours; at 80 °C | |
| 2nd heat-treatment | 500 °C / 30 minutes | 500 °C / 30 minutes | |
| $C_{dyn, DBT}$, wt% | 0.075 | 0.059 | 0.084 |
| $C_{dyn, DMDBT}$, wt% | 0.159 | 0.079 | 0.115 |
| $R_{equil, DBT}$, % | 28.0 | 25.5 | 2.4 |
| $R_{equil, DMDBT}$, % | 42.0 | 39.6 | 67.7 |

Equilibrium sulfur removal percentages ($R_{equi.}$) for Samples S and U.

METAL NANOPARTICLE-DEPOSITED, NITROGEN-DOPED CARBON ADSORBENTS FOR REMOVAL OF SULFUR IMPURITIES IN FUELS

RELATED APPLICATION

This application is a divisional application of and claims priority to U.S. patent application Ser. No. 16/285,764, filed on Feb. 26, 2019, which application claims the benefit of U.S. Provisional Application No. 62/635,482, filed on Feb. 26, 2018. All of the foregoing applications are incorporated herein by reference.

TECHNICAL FIELD

The invention relates to a novel adsorbent and method for removing sulfur compounds from hydrocarbon feed streams, particularly for removing sulfur compounds from liquid fuels. In one embodiment, the invention relates to the removal of thiophene and thiophene derivatives from liquid fuels including diesel and jet fuel.

BACKGROUND

One of the major challenges facing petroleum refiners today is the ultra-deep desulfurization of diesel, which requires that sulfur levels be reduced to less than 10 ppm. While the concentrations of thiophenes and, to a lesser extent, benzothiophenes can be reduced to the required levels by catalytic hydrodesulfurization, in which the organic sulfur species are converted to $H_2S$ and the corresponding hydrocarbon, removal of sulfur from 4,6-dialkyl dibenzothiophenes to a similar extent is extremely difficult in part because the alkyl groups inhibit access to the sulfur atom. A further complication is that the hydrogen demand for removing sulfur from dialkyl dibenzothiophenes is greater than that from other sulfur-containing molecules because one of the benzene rings must first undergo hydrogenation before desulfurization can occur. Furthermore, at the high hydrogen pressures required for desulfurization of dialkyl dibenzothiophenes, some of the aromatic compounds present in diesel also undergo hydrogenation, further raising the overall hydrogen required for ultra-deep desulfurization.

A possible alternative to hydrodesulfurization is selective adsorption of thiophene derivatives on a solid adsorbent. The most promising of materials that have been explored to date are based on cation-exchanged zeolites and metals, metal halides, other metal salts supported on activated carbon (AC). Metal cations such as $Na^+$, $K^+$, $Ag^+$, $Ni^{2+}$, $Zn^{2+}$, $Pd^{2+}$, $Fe^{3+}$, $Ce^{3+}$ have been considered as adsorption centers. Adsorbents based on activated carbon have generally been found to exhibit higher adsorption capacities than those based on zeolites, and it has been reported that the adsorption capacity for benzothiophene and dibenzothiophene follows the order $Ag^+/AC > Ni^{2+}/AC > Cu^{2+}/AC > Zn^{2+}/AC > Fe^{3+}/AC$. Amongst zeolitic materials, $Cu^+/Y$ has been reported to be the most effective.

Additionally, U.S. Pat. No. 9,719,028 discloses a method for predicting selective performance of an adsorbent where the adsorbent is selected from a list of metals and/or metal cations for use in removing contaminants as thiophene derivatives in a hydrocarbon feed. The metals or metal cations were identified from a list having a positive value for $E_{rel}$, wherein the metal or metal cation having the largest value for $E_{rel}$ is the most selective adsorbent. U.S. Pat. No. 9,719,028 studied competitive interaction between transition metals and thiophene and derivatives, and their aromatic counterparts of comparable aromaticity in the gas phase using a computation simulation approach. U.S. Pat. No. 9,719,028 teaches adsorption selectivity of thiophenes over aromatics dramatically changed with even a slight difference in charges of same metal ions.

What has not been identified in these studies are adsorbents capable of removing aromatic sulfur compounds such as benzothiophene, dibenzothiophene, and other thiophene derivatives from a liquid hydrocarbon feed steam containing aromatics with a similar aromaticity or same ring number as the aromatic sulfur compounds. This is an important issue, since liquid fuels, such as hydrotreated diesel, contain much higher concentrations of arenes (often more than 10%) than of thiophene derivatives (often less than 50 ppm) following deep hydro-desulfurization.

Thus there is still a need for improved adsorbents that will preferentially remove sulfur compounds from hydrocarbon feed streams, such as liquid hydrocarbon feed streams. More specifically, there is still a need for improved adsorbents that will preferentially remove aromatic sulfur compounds including benzothiophene, dibenzothiophene, and derivatives thereof from liquid fuels containing arenes.

SUMMARY

In one aspect, the invention relates to a method for removing sulfur compounds from a hydrocarbon feed stream, such as a liquid hydrocarbon feed stream. The method comprises the steps of: a) providing a first hydrocarbon feed stream, which is contaminated with sulfur compounds; and b) passing the first hydrocarbon feed stream through a desulfurization system comprising a metal nanoparticle-deposited, nitrogen-doped carbon adsorbent to produce a second hydrocarbon feed stream which has a substantially reduced concentration of sulfur compounds as compared to the first hydrocarbon feed stream. In some embodiments, the second hydrocarbon feed stream had a concentration of sulfur compounds in the second hydrocarbon feed stream which were from about 50% to about 99.9% less than the concentration of sulfur compounds in the first hydrocarbon feed stream. In some embodiments, the present invention provides a method for removing sulfur compounds from a hydrocarbon feed stream comprising: a) providing a first hydrocarbon feed stream, which is contaminated with sulfur compounds; and b) passing the first hydrocarbon feed stream through a desulfurization system comprising a metal nanoparticle-deposited, nitrogen-doped carbon adsorbent to produce a second hydrocarbon feed stream which has about 30% to about 99.9% by weight less sulfur compounds than the first hydrocarbon feed stream.

In another aspect, the invention relates to a nitrogen-doped carbon adsorbent, produced by a process comprising: a) contacting at least one nitrogen precursor and a suitable first metal-containing salt in a first strong acid solution; b) contacting the product of a) and an oxidant; c) heating the product of b), thereby producing the nitrogen-doped carbon adsorbent.

In yet another aspect, the present invention provides a metal nanoparticle-deposited, nitrogen-doped carbon adsorbent, produced by a process comprising: a) contacting at least one nitrogen precursor and a suitable first metal-containing salt in a first strong acid solution; b) contacting the product of a) and an oxidant; c) heating the product of b); d) contacting the product of c) with a second strong acid solution; e) heating the product of d); and f) contacting a nitrogen-doped carbon adsorbent with a second metal-containing salt; thereby producing the metal nanoparticle-deposited, nitrogen-doped carbon adsorbent.

A general embodiment of the disclosure is a metal nanoparticle-deposited, nitrogen-doped carbon adsorbent, produced by a process comprising: a) contacting at least one nitrogen precursor and a suitable first metal-containing salt in a first strong acid solution; b) contacting a product of a) and an oxidant; c) heating a product of b) in an inert atmosphere; d) contacting a product of c) with a second strong acid solution; e) heating a product of d) in an inert atmosphere, f) contacting a nitrogen-doped carbon adsorbent with a second metal-containing salt; thereby producing the metal nanoparticle-deposited, nitrogen-doped carbon adsorbent. Another embodiment can be a method of making a metal nanoparticle-deposited, nitrogen-doped carbon absorbent. In some embodiments, the second metal-containing salt is a gold-containing salt, and the metal nanoparticle-deposited, nitrogen-doped carbon adsorbent is a gold nanoparticle-deposited, nitrogen-doped carbon adsorbent. In certain embodiments, said a) is contacting two nitrogen precursors and the suitable first metal-containing salt in a first strong acid solution. In a further embodiment, said two nitrogen precursors are a first nitrogen precursor which is aniline and a second nitrogen precursor which is cyanimide. In one embodiment, said b) is contacting the product of a) and $(NH_4)_2S_2O_8$, thus forming an oxidized product, and contacting said oxidized product with an aqueous solution containing carbon black and a low molecular weight alcohol. In some instances, said c) is heating the product of b) to a first temperature of from about 35° C. to about 100° C., and then to a second temperature of from about 500° C. to about 1000° C. In embodiments, said d) is contacting the product of c) with either an $H_2SO_4$ solution or a $HNO_3$ solution. In certain embodiments, said e) is heating the product of d) from about 500° C. to about 1000° C. Further, f) can comprise a reducing agent, or f) may not comprise a reducing agent. In an embodiment, the second strong acid has a pH of less than 3, less than 2, less than 1, or less than 0.5. In an embodiment, the first strong acid has a pH of less than 3, less than 2, less than 1, or less than 0.5.

Another general embodiment is a method for removing sulfur compounds from a hydrocarbon feed stream comprising: a) providing a first hydrocarbon feed stream, which is contaminated with the sulfur compounds; and b) passing the first hydrocarbon feed stream through a desulfurization system comprising the metal nanoparticle-deposited, nitrogen-doped carbon adsorbent of the disclosure, to produce a second hydrocarbon feed stream which has about 30% to about 99.9% by weight less of the sulfur compounds than the first hydrocarbon feed stream. The hydrocarbon feed stream can be a liquid hydrocarbon feed stream. In some embodiments, the liquid hydrocarbon feed stream is selected from the group consisting of diesel fuel, jet fuel, gasoline, kerosene, compressed natural gas, and liquefied petroleum gas (LPG). Further, the sulfur compounds can comprise dibenzothiophene (DBT) and/or 4,6-dimethyldibenzothiophene (DMDBT).

The present invention may suitably comprise, consist of, or consist essentially of, the elements in the claims, as described herein.

BRIEF DESCRIPTION OF THE DRAWINGS

FIG. 1 summarizes synthesis conditions and desulfurization capacities of adsorbent samples A-C and E-G. K.J. is Ketjenblack.

FIG. 2 summarizes synthesis conditions and desulfurization capacities of adsorbent samples D, H-J, and L-N. K.J. is Ketjenblack.

FIG. 3 summarizes synthesis conditions and desulfurization capacities of adsorbent samples P, S, and U. K.J. is Ketjenblack.

DETAILED DESCRIPTION

I. Definitions and Abbreviations

Figure 4:
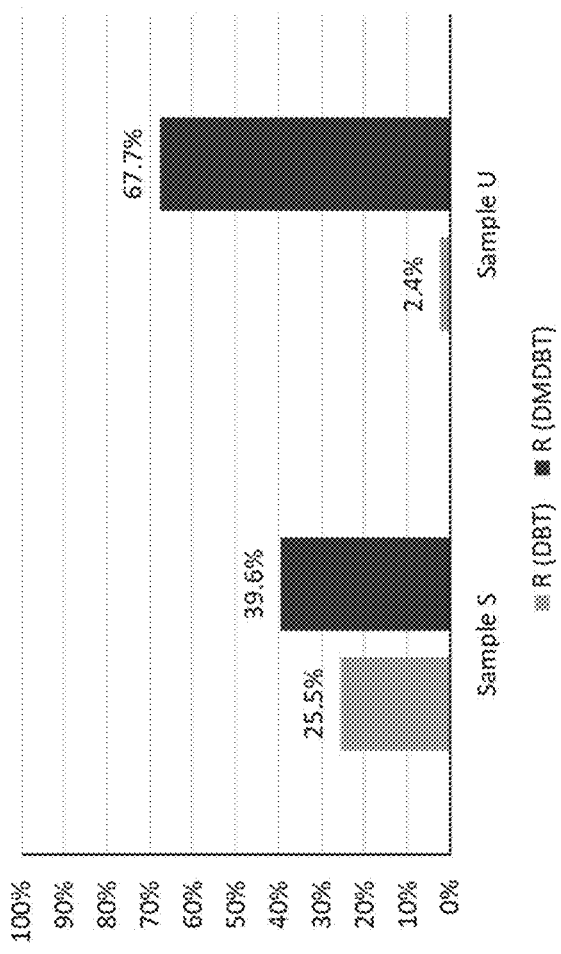
FIG. 4 shows equilibrium sulfur removal percentages ($R_{equi.}$) for Samples S and U.

As used herein, the singular forms "a," "an", and "the" include plural references unless the context clearly dictates otherwise. For example, reference to "an active agent" includes a single active agent as well as two or more different active agents in combination. It is to be understood that present teaching is not limited to the specific dosage forms, carriers, or the like, disclosed herein and as such may vary.

The abbreviations used herein generally have their conventional meaning within the chemical and biological arts.

Where substituent groups are specified by their conventional chemical formulae, written from left to right, they equally encompass the chemically identical substituents, which would result from writing the structure from right to left, e.g., —$CH_2O$— is intended to also recite —$OCH_2$—.

The term "poly" as used herein means at least 2. For example, a polyvalent metal ion is a metal ion having a valency of at least 2.

"Moiety" refers to a radical of a molecule that is attached to the remainder of the molecule.

The term "sulfur compounds" refers to sulfur compounds having a boiling point within or about the boiling point range of liquid fuel. Examples of sulfur compounds include thiophenes, disulfides, sulfoxides, mercaptans, and derivatives thereof. Examples of sulfur compounds also include higher molecular weight organic sulfur-containing compounds including, benzothiophene and dibenzothiophene derivatives optionally substituted with 1-4 groups each independently selected from the group consisting of linear or branched alkyl, heteroalkyl, cycloalkyl, heterocycloalkyl, aryl, heteroaryl, naphthenic and hetero-naphthenic derivatives, and derivatives thereof. Examples of sulfur compounds also include benzothiophene, dibenzothiophene (DBT), 4,6-dimethyldibenzothiophene (DMDBT).

The term "hydrocarbon feed stream" refers to gas or liquid fuels. In an exemplary embodiment, the hydrocarbon feed stream is a liquid fuel. In an exemplary embodiment, the hydrocarbon feed stream is a liquid fuel which is diesel fuel, jet fuel, gasoline, kerosene, compressed natural gas, or liquefied petroleum gas (LPG).

The term "metal nanoparticle-deposited, nitrogen-doped carbon adsorbent" refers to the composites in which nanoscale metal particles are deposited onto nitrogen-doped carbons, or namely metal/carbon nanocomposite adsorbents hereafter.

The term "nanoparticle" refers to particles that have a mean diameter of between 1 to 1000 nanometers and less than that of microparticles.

The term "compounds having a boiling point within or about the boiling point range of liquid fuel" refers to any liquid fuels with boiling point above about 180° F., such as from about 180° F. to about 750° F. In an exemplary embodiment, the liquid fuels have a boiling point above about 250° F., such as from about 250° F. to about 750° F.

The term "compounds having a boiling point within or about the boiling point range of liquid fuel" refers to any liquid fuels with boiling point above 180° F., or preferably above 250° F. Test methods for boiling range determinations are located in the most current versions of ASTM D 2887 and ASTM D 6352. The test method is referred to herein as "SimDist". The boiling range determination by distillation is simulated by the use of gas chromatography. The boiling range distributions obtained by this test method are essentially equivalent to those obtained by true boiling point (TBP) distillation (see ASTM Test Method D 2892), but are not equivalent to results from low efficiency distillations such as those obtained with ASTM Test Methods D 86 or D 1160. Light naphtha fuel has a boiling point range of from about $C_5$ to about 180° F. (from about $C_5$ to about 82° C.). Heavy naphtha fuel has a boiling point range of from about 180° F. to about 300° F. (from about 82° C. to about 149° C.). Jet fuel has a boiling point range of from about 300° F. to about 380° F. (from about 149° C. to about 193° C.). Kerosene fuel has a boiling point range of from about 380° F. to about 530° F. (from about 193° C. to about 277° C.). Diesel fuel has a boiling point range of from about 530° F. to about 700° F. (from about 277° C. to about 371° C.). The test methods used for boiling range distributions and boiling points of the compositions in this disclosure are the most current versions of ASTM D 2887 and ASTM D 6352.

The term "higher molecular weight organic sulfur-containing compounds" refers to at least 2-ring polycyclic aromatics with at least one carbon atom in the aromatic ring being replaced by S atom. In an exemplary embodiment, the higher molecular weight organic sulfur-containing compounds include benzothiophenes, dibenzothiophenes, and their derivatives, optionally substituted with one or multiple groups consisting of linear or branched alkyl, cycloalkyl, aryl, naphthenic and derivatives, and derivatives thereof.

The term "liquid hourly space velocity" (LHSV) refers to a method for relating the reactant liquid flow rate to the reactor volume at a standard temperature. LHSV is the ratio of the hourly volume of the hydrocarbon feed stream being processed to the volume of adsorbent. It is generally expressed as v/v/hr or $hr^{-1}$.

"Solvent" as used herein is intended to include a wide variety of solvents including organic solvents, aromatic solvents, nitrogen-containing polar organic solvents, and oxygen-containing polar organic solvents. Examples of organic solvents include acetic acid, acetone, acetonitrile, benzene, toluene, benzonitrile, benzyl alcohol, 1-butanol, 2-butanol, n-butanol, 2-butaone, 2-t-butyl alcohol, carbon tetrachloride, chlorobenzene, 1,2-dichlorobenzene, 1,2-difluorobenzene, chloroform, cyclohexane, 1,2-dichloroethane, diethylene glycol, diethyl ether, dimethylacetamide (DMAc), dimethyl ether diglyme (diethylene glycol dimethyl ether), 1-diethylaminoethanol, diethylformamide, 1,2-dimethoxy-ethane (glyme, DME), dimethylformamide (DMF), dioxane, 1,4-dioxane, ethanol, ethyl acetate, ethylene dichloride, ethylene glycol, formic acid, glycerin, heptane, hexamethylphosphoramide (HMPA), hexamethylphosphorous triamide (HMPT), hexanes, isopropanol, methanol, methyl t-butyl ether (MTBE), methylene chloride, N-methyl-2-pyrrolidinone (NMP), nitromethane, pentane, petroleum ether (ligroine), 1-propanol, 2-propanol, n-propanol, pyridine, tetrahydrofuran (THF), toluene, triethyl amine, o-xylene, m-xylene, and p-xylene. Examples of aromatic solvents include benzene, benzonitrile, benzenethiol, benzyl alcohol, chlorobenzene, 1,2-dichlorobenzene, 1,2-difluorobenzene, hexafluorobenzene, mesitylene, nitrobenzene, phenol, pyridine, tetralin, toluene, 1,2,4-trichlorobenzene, trifluorotoluene, and xylene. Examples of nitrogen-containing polar organic solvents include acetonitrile, benzonitrile, dimethylformamide (DMF), diethylformamide, 1-diethylaminoethanol, dimethylacetamide (DMAc), hexamethylphosphorous triamide (HMPT), hexamethylphosphoramide (HMPA), N-methyl-2-pyrrolidinone (NMP), nitromethane, pyridine, and triethyl amine. Examples of oxygen-containing polar organic solvents include acetic acid, acetone, benzyl alcohol, 1-butanol, 2-butanol, n-butanol, 2-butaone, 2-t-butyl alcohol, diethylene glycol, diethyl ether, dimethylacetamide (DMAc), dimethyl ether diglyme (diethylene glycol dimethyl ether), 1-diethylaminoethanol, diethylformamide, 1,2-dimethoxyethane (glyme, DME), dimethylformamide (DMF), dimethyl sulfoxide (DMSO), dioxane, 1,4-dioxane, ethanol, ethyl acetate, ethylene glycol, formic acid, glycerin, hexamethylphosphoramide (HMPA), hexamethylphosphorous triamide (HMPT), isopropanol, methanol, methyl t-butyl ether (MTBE), N-methyl-2-pyrrolidinone (NMP), 1-propanol, 2-propanol, n-propanol, and tetrahydrofuran (THF).

The term "alkyl," by itself or as part of another substituent, means, unless otherwise stated, a straight or branched chain, or cyclic hydrocarbon radical, or combination thereof, which may be fully saturated, mono- or polyunsaturated and can include di- and multivalent radicals, having the number of carbon atoms designated (i.e. $C_1$-$C_{10}$ means one to ten carbons). In some embodiments, the term "alkyl" means a straight or branched chain, or combinations thereof, which may be fully saturated, mono- or polyunsaturated and can include di- and multivalent radicals. Examples of saturated hydrocarbon radicals include, but are not limited to, groups such as methyl, ethyl, n-propyl, isopropyl, n-butyl, t-butyl, isobutyl, sec-butyl, cyclobutyl, cyclohexyl, (cyclohexyl)methyl, cyclopropyl, cyclopropylmethyl, homologs and isomers of, for example, n-pentyl, n-hexyl, n-heptyl, n-octyl, and the like. Alkyl can include any number of carbons, such as 1-2, 1-3, 1-4, 1-5, 1-6, 1-7, 1-8, 1-9, 1-10, 2-3, 2-4, 2-5, 2-6, 3-4, 3-5, 3-6, 4-5, 4-6 and 5-6. The alkyl group is typically monovalent, but can be divalent, such as when the alkyl group links two moieties together.

An unsaturated alkyl group is one having one or more double bonds or triple bonds. Examples of unsaturated alkyl groups include, but are not limited to, vinyl, 2-propenyl, crotyl, 2-isopentenyl, 2-(butadienyl), 2,4-pentadienyl, 3-(1, 4-pentadienyl), ethynyl, 1- and 3-propynyl, 3-butynyl, and the higher homologs and isomers.

Substituents for the optionally substituted groups can be a variety of groups selected from: R', —OR', =O, =NR', =N—OR', —NR'R", —SR', -halogen, —SiR'R"R'", —OC(O)R', —C(O)R', —CO$_2$R', —CONR'R", —OC(O)NR'R", —NR"C(O)R', —NR'—C(O)NR"R'", —NR"C(O)$_2$R', —NR—C(NR'R")=NR'", —NH—C(NH$_2$)=NH, —NR'C(NH$_2$)=NH, —NH—C(NH$_2$)=NR', —S(O)R', —S(O)$_2$R', —S(O)$_2$NR'R", —CN and —NO$_2$ in a number ranging from zero to (2m'+1), where m' is the total number of carbon atoms in such radical. R', R" and R'" each independently refer to hydrogen, unsubstituted ($C_1$-$C_8$) alkyl and heteroalkyl, unsubstituted aryl, aryl substituted with 1-3 halogens, unsubstituted alkyl, alkoxy or thioalkoxy groups, or aryl-($C_1$-$C_4$)alkyl groups. When a compound of the invention includes more than one R group, for example, each of the R groups is independently selected as are each R', R", and R'" groups when more than one of these groups is present. When R' and R" are attached to the same nitrogen atom, they can be combined with the nitrogen atom to form a 5-, 6-, or 7-membered ring. For example, —NR'R" is meant to include, but not be limited to, 1-pyrrolidinyl and 4-morpholinyl. From the above discussion of substituents, one of skill in the art will understand that the term "alkyl" is meant to include groups including carbon atoms bound to groups other than hydrogen groups, such as haloalkyl (e.g., —CF$_3$ and —CH$_2$CF$_3$) and acyl (e.g., —C(O)CH$_3$, —C(O)CF$_3$, —C(O)CH$_2$OCH$_3$, and the like) which are also preferred and contemplated by the present invention.

As used herein, the term "alkylene" refers to an alkyl group, as defined above, linking at least two other groups, i.e., a divalent hydrocarbon radical. The two moieties linked to the alkylene can be linked to the same atom or different atoms of the alkylene. For instance, a straight chain alkylene can be the bivalent radical of —(CH$_2$)$_n$—, where n is 1, 2, 3, 4, 5 or 6. Alkylene groups include, but are not limited to, methylene, ethylene, propylene, isopropylene, butylene, isobutylene, sec-butylene, pentylene and hexylene.

The term "aryl" means, unless otherwise stated, a polyunsaturated, aromatic, substituent that can be a single ring or multiple rings (preferably from 1 or 2 or 3 rings), which are fused together or linked covalently For brevity, the term "aryl" when used in combination with other terms (e.g., aryloxy, arylthioxy, arylalkyl) includes both aryl and heteroaryl rings as defined above. Thus, the term "arylalkyl" is meant to include those radicals in which an aryl group is attached to an alkyl group (e.g., benzyl, phenethyl, pyridylmethyl and the like) including those alkyl groups in which a carbon atom (e.g., a methylene group) has been replaced by, for example, an oxygen atom (e.g., phenoxymethyl, 2-pyridyloxymethyl, 3-(1-naphthyloxy)propyl, and the like).

Each of the above terms (e.g., "alkyl," "aryl," and "heteroaryl") are meant to include both substituted and unsubstituted forms of the indicated radical. Preferred substituents are provided below.

Substituents for the alkyl and heteroalkyl radicals (including those groups often referred to as alkylene, alkenyl, heteroalkylene, heteroalkenyl, alkynyl, cycloalkyl, heterocycloalkyl, cycloalkenyl, and heterocycloalkenyl) are generically referred to as "alkyl group substituents," and they can be one or more of a variety of groups selected from, but not limited to: —R', —OR', =O, =NR', =N—OR', —NR'R", —SR', -halogen, —SiR'R"R'", —OC(O)R', —C(O)R', —CO$_2$R', —CONR'R", —OC(O)NR'R", —NR"C(O)R', —NR'—C(O)NR"R'", —NR"C(O)$_2$R', —NR""—C(NR'R"R''')=NR"", —NR""—C(NR'R")=NR''', —S(O)R', —S(O)$_2$R', —S(O)$_2$NR'R", —NR"SO$_2$R', —CN, —NO$_2$, —N$_3$, —CH(Ph)$_2$, fluoro(C$_1$-C$_4$)alkoxy, and fluoro(C$_1$-C$_4$)alkyl, in a number ranging from zero to (2m'+1), where m' is the total number of carbon atoms in such radical. R', R", R'", R"" and R""' each preferably independently refer to hydrogen, substituted or unsubstituted haloalkyl, substituted or unsubstituted heteroalkyl, substituted or unsubstituted heterocycloalkyl, substituted or unsubstituted aryl, e.g., aryl substituted with 1-3 halogens, substituted or unsubstituted alkyl, alkoxy or thioalkoxy groups, or arylalkyl groups. When a compound of the invention includes more than one R group, for example, each of the R groups is independently selected as are each R', R", R'", R"" and R""' groups when more than one of these groups is present. When R' and R" are attached to the same nitrogen atom, they can be combined with the nitrogen atom to form a 5-, 6-, or 7-membered ring. For example, —NR'R" is meant to include, but not be limited to, 1-pyrrolidinyl and 4-morpholinyl. From the above discussion of substituents, one of skill in the art will understand that the term "alkyl" is meant to include groups including carbon atoms bound to groups other than hydrogen groups, such as haloalkyl (e.g., —CF$_3$ and —CH$_2$CF$_3$) and acyl (e.g., —C(O)CH$_3$, —C(O)CF$_3$, —C(O)CH$_2$OCH$_3$, and the like).

Similar to the substituents described for the alkyl radical, substituents for the aryl and heteroaryl groups are generically referred to as "aryl group substituents." The substituents are selected from, for example: —R', —OR', =O, =NR', =N—OR', —NR'R", —SR', halogen, —SiR'R"R'", —OC(O)R', —C(O)R', —CO$_2$R', —CONR'R", —OC(O)NR'R", —NR"C(O)R', —NR'—C(O)NR"R'", —NR"C(O)$_2$R', —NR""-C(NR'R"R''')=NR"", —NR""—C(NR'R")=NR''', —S(O)R', —S(O)$_2$R', —S(O)$_2$NR'R", —NR"SO$_2$R', —CN, —NO$_2$, —N$_3$, —CH(Ph)$_2$, fluoro(C$_1$-C$_4$)alkoxy, and fluoro(C$_1$-C$_4$)alkyl, in a number ranging from zero to the total number of open valences on the aromatic ring system; and where R', R", R'", R"" and R""' are preferably independently selected from hydrogen, substituted or unsubstituted alkyl, substituted or unsubstituted heteroalkyl, substituted or unsubstituted aryl and substituted or unsubstituted heteroaryl. When a compound of the invention includes more than one R group, for example, each of the R groups is independently selected as are each R', R", R'", R"" and R""' groups when more than one of these groups is present.

Two of the substituents on adjacent atoms of the aryl or heteroaryl ring may optionally be replaced with a substituent of the formula -T-C(O)—(CRR')$_q$—U—, wherein T and U are independently —NR—, —O—, —CRR'— or a single bond, and q is an integer of from 0 to 3. Alternatively, two of the substituents on adjacent atoms of the aryl or heteroaryl ring may optionally be replaced with a substituent of the formula -A-(CH$_2$)$_r$—B—, wherein A and B are independently —CRR'—, —O—, —NR—, —S—, —S(O)—, —S(O)$_2$—, —S(O)$_2$NR'— or a single bond, and r is an integer of from 1 to 4. One of the single bonds of the new ring so formed may optionally be replaced with a double bond. Alternatively, two of the substituents on adjacent atoms of the aryl or heteroaryl ring may optionally be replaced with a substituent of the formula —(CRR')$_s$—X—(CR"R''')$_d$—, where s and d are independently integers of from 0 to 3, and X is —O—, —NR'—, —S—, —S(O)—, —S(O)$_2$—, or —S(O)$_2$NR'—. The substituents R, R', R" and R'" are preferably independently selected from hydrogen or substituted or unsubstituted C$_1$ or C$_2$ or C$_3$ or C$_4$ or C$_5$ or C$_6$ alkyl.

"Ring" as used herein, means a substituted or unsubstituted cycloalkyl, substituted or unsubstituted heterocycloalkyl, substituted or unsubstituted aryl, or substituted or unsubstituted heteroaryl. A ring includes fused ring moieties. The number of atoms in a ring is typically defined by the number of members in the ring. For example, a "5- to 7-membered ring" means there are 5 or 6 or 7 atoms in the encircling arrangement. Unless otherwise specified, the ring optionally includes a heteroatom. Thus, the term "5 to 7-membered ring" or "5 or 6 or 7 membered ring" includes, for example phenyl, pyridinyl and piperidinyl. The term "5 to 7-membered heterocycloalkyl ring" "5 or 6 or 7-membered heterocycloalkyl ring", on the other hand, would include pyridinyl and piperidinyl, but not phenyl. The term "ring" further includes a ring system comprising more than one "ring", wherein each "ring" is independently defined as above.

As used herein, the term "heteroalkyl" refers to an alkyl group having from 1 to 3 heteroatoms such as N, O and S. Additional heteroatoms can also be useful, including, but not limited to, B, Al, Si and P. The heteroatoms can also be oxidized, such as, but not limited to, —S(O)— and —S(O)$_2$—. For example, heteroalkyl can include ethers, thioethers and alkyl-amines.

As used herein, the term "heteroalkylene" refers to a heteroalkyl group, as defined above, linking at least two other groups. The two moieties linked to the heteroalkylene can be linked to the same atom or different atoms of the heteroalkylene.

As used herein, the term "heteroaryl" refers to a monocyclic or fused bicyclic or tricyclic aromatic ring assembly containing 5 to 16 ring atoms, where from 1 to 4 of the ring atoms are a heteroatom each N, O or S. For example, heteroaryl includes pyridyl, indolyl, indazolyl, quinoxalinyl, quinolinyl, isoquinolinyl, benzothienyl, benzofuranyl, furanyl, pyrrolyl, thiazolyl, benzothiazolyl, oxazolyl, isoxazolyl, triazolyl, tetrazolyl, pyrazolyl, imidazolyl, thienyl, or any other radicals substituted, especially mono- or di-substituted, by e.g. alkyl, nitro or halogen. Pyridyl represents 2-, 3- or 4-pyridyl, advantageously 2- or 3-pyridyl. Thienyl represents 2- or 3-thienyl. Quinolinyl represents preferably 2-, 3- or 4-quinolinyl. Isoquinolinyl represents preferably 1-, 3- or 4-isoquinolinyl. Benzopyranyl, benzothiopyranyl represents preferably 3-benzopyranyl or 3-benzothiopyranyl, respectively. Thiazolyl represents preferably 2- or 4-thiazolyl, and most preferred, 4-thiazolyl. Triazolyl is preferably 1-, 2- or 5-(1,2,4-triazolyl). Tetrazolyl is preferably 5-tetrazolyl.

Preferably, heteroaryl is pyridyl, indolyl, quinolinyl, pyrrolyl, thiazolyl, isoxazolyl, triazolyl, tetrazolyl, pyrazolyl, imidazolyl, thienyl, furanyl, benzothiazolyl, benzofuranyl, isoquinolinyl, benzothienyl, oxazolyl, indazolyl, or any of the radicals substituted, especially mono- or di-substituted.

Similarly, substituents for the aryl and heteroaryl groups are varied and are selected from: -halogen, —OR', —OC(O)R', —NR'R", —SR', —R', —CN, —NO$_2$, —CO$_2$R', —CONR'R", —C(O)R', —OC(O)NR'R", —NR"C(O)R', —NR"C(O)$_2$R', —NR'—C(O)NR"R'", —NH—C(NH$_2$)=NH, —NR' C(NH$_2$)=NH, —NH—C(NH$_2$)=NR', —S(O)R', —S(O)$_2$R', —S(O)$_2$NR'R", —N$_3$, —CH(Ph)$_2$, perfluoro(C$_1$-C$_4$)alkoxy, and perfluoro(C$_1$-C$_4$)alkyl, in a number ranging from zero to the total number of open valences on the aromatic ring system; and where R', R" and R'" are independently selected from hydrogen, (C$_1$-C$_8$)alkyl and heteroalkyl, unsubstituted aryl and heteroaryl, (unsubstituted aryl)-(C$_1$-C$_4$)alkyl, and (unsubstituted aryl)oxy-(C$_1$-C$_4$)alkyl.

As used herein, the term "heterocycloalkyl" refers to a ring system having from 3 ring members to about 20 ring members and from 1 to about 5 heteroatoms such as N, O and S. Additional heteroatoms can also be useful, including, but not limited to, B, Al, Si and P. The heteroatoms can also be oxidized, such as, but not limited to, —S(O)— and —S(O)$_2$—. For example, heterocycle includes, but is not limited to, tetrahydrofuranyl, tetrahydrothiophenyl, morpholino, pyrrolidinyl, pyrrolinyl, imidazolidinyl, imidazolinyl, pyrazolidinyl, pyrazolinyl, piperazinyl, piperidinyl, indolinyl, quinuclidinyl and 1,4-dioxa-8-aza-spiro[4.5]dec-8-yl. As used herein, the term "heterocyclalkylene" refers to a heterocyclalkyl group, as defined above, linking at least two other groups. The two moieties linked to the heterocyclalkylene can be linked to the same atom or different atoms of the heterocyclalkylene.

As used herein "carbon" refers to suitable carbon additives including carbon blacks. Carbon black is a material produced by the incomplete combustion of heavy petroleum products such as fluid catalytic cracker (FCC) tar, coal tar, ethylene cracking tar, and a small amount from vegetable oil. Carbon blacks include subtypes, such as acetylene black, channel black, furnace black, lamp black, and thermal black. Examples of carbon blacks include Ketjenblack EC300J, Ketjenblack EC600JD, Black Pearls 2000, Vulcan XC-72, Vulcan P, Sterling C, Norit A, Darco G-60, activated carbon, MV-B-1500 and MWV 295-R-03 activated carbons.

The symbol "R" is a general abbreviation that represents a substituent group that is selected from substituted or unsubstituted alkyl, substituted or unsubstituted heteroalkyl, substituted or unsubstituted aryl, substituted or unsubstituted heteroaryl, substituted or unsubstituted cycloalkyl and substituted or unsubstituted heterocycloalkyl groups.

"Periodic Table" refers to the International Union of Pure & Applied Chemistry (IUPAC) Periodic Table of the Elements, version dated 28 Nov. 2016.

The term "substantially", as used herein, is meant to include a range from 20% to 100%. In an exemplary embodiment, "substantially includes a range from 20% to about 30%, from about 30% to about 40%, from about 40% to about 50%, from about 50% to about 60%, from about 60% to about 70%, from about 70% to about 80%, from about 80% to about 90%, from about 90% to about 99.5%, from about 90% to about 99.9%, from about 90% to 100%, from 20% to about 40%, from about 30% to about 50%, from about 40% to about 60%, from about 50% to about 70%, from about 60% to about 80%, from about 70% to about 90%, from about 80% to about 100%, from about 80% to about 99.5%, from 20% to about 50%, from about 30% to about 60%, from about 40% to about 70%, from about 50% to about 80%, from about 60% to about 90%, from about 70% to about 99.5%, from 20% to about 60%, from about 30% to about 70%, from about 40% to about 80%, from about 50% to about 90%, from about 60% to about 99.5%, from 20% to about 70%, from about 30% to about 80%, from about 40% to about 90%, from about 50% to about 99.5%, from 20% to about 80%, from about 30% to about 90%, from about 40% to about 99.5%, from about 30% to about 90%, and from about 30% to about 99.5%.

II. Introduction

In some embodiments, the invention provides a novel adsorbent. The novel adsorbent can be used for removing sulfur compounds from hydrocarbon feed streams, particularly for removing sulfur compounds from liquid fuels.

III. The Adsorbents

In an exemplary embodiment, the adsorbent comprises a nitrogen-doped carbon adsorbent. In an exemplary embodiment, the adsorbent is a nitrogen-doped carbon adsorbent. In an exemplary embodiment, the nitrogen-doped carbon adsorbent does not comprise a metal nanoparticle. In an exemplary embodiment, the adsorbent comprises a metal nanoparticle-deposited, nitrogen-doped carbon adsorbent. In an exemplary embodiment, the adsorbent is a metal nanoparticle-deposited, nitrogen-doped carbon adsorbent. The adsorbents of the present invention can have any adsorbent structure including amorphous, crystalline, and mixtures thereof.

IIIa. Nitrogen-Doped Carbon Adsorbents

In an exemplary embodiment, the adsorbent comprises a nitrogen-doped carbon adsorbent. In an exemplary embodiment, the adsorbent is a nitrogen-doped carbon adsorbent. In an exemplary embodiment, the nitrogen-doped carbon adsorbent does not comprise a metal nanoparticle. In an exemplary embodiment, the adsorbent is prepared by a process described herein. In an exemplary embodiment, the adsorbent is prepared by a process found in the Examples. The adsorbents of the present invention can have any adsorbent structure including amorphous, crystalline, and mixtures thereof.

IIIb. Synthesis of Nitrogen-Doped Carbon Adsorbents

In an exemplary embodiment, the nitrogen-doped carbon adsorbent is produced by a process comprising:
a) contacting at least one nitrogen precursor and a suitable first metal-containing salt in a first strong acid solution;
b) contacting the product of a) and an oxidant;
c) heating the product of b);
thereby producing the nitrogen-doped carbon adsorbent.

In an exemplary embodiment, the nitrogen precursor comprises aniline. In an exemplary embodiment, the nitrogen precursor is aniline. In an exemplary embodiment, the nitrogen precursor is aniline, pyrrole, phenanthroline, melamine, urea, purine, pyrazine, bipyridine, cyanimide, dicyanimide, or oxalate, or a combination thereof. In an exemplary embodiment, the nitrogen precursor is pyrrole, phenanthroline, melamine, urea, purine, pyrazine, bipyridine, or a combination thereof. In an exemplary embodiment, the nitrogen precursor is cyanimide. In an exemplary embodiment, the nitrogen precursor is cyanimide, dicyanamide, or oxalate, or a combination thereof. In an exemplary embodiment, the nitrogen precursor is cyanimide. In an exemplary embodiment, the nitrogen precursor comprises aniline and cyanimide. In an exemplary embodiment, the nitrogen precursor comprises aniline and dicyanimide. In an exemplary embodiment, the nitrogen precursor comprises aniline and oxalate. In an exemplary embodiment, the nitrogen precursor comprises cyanimide. In an exemplary embodiment, the process comprises a) contacting a first nitrogen precursor and a second nitrogen precursor and a suitable first metal-containing salt in a first strong acid solution. In an exemplary embodiment, the first nitrogen precursor is aniline and the second nitrogen precursor is cyanimide.

In an exemplary embodiment, the first metal in the suitable metal-containing salt is selected from the group consisting of metals of periodic table Period 4/Group 4-12. In an exemplary embodiment, the first metal in the suitable metal-containing salt is selected from the group consisting of Mn, Fe, Co, Ni, Cu, and Zn. In an exemplary embodiment, the suitable first metal-containing salt is a suitable salt of Fe or a suitable salt of Ni. In an exemplary embodiment, the suitable first metal-containing salt is selected from the group consisting of iron fluoride, iron chloride, iron bromide, iron iodide, iron acetate, iron nitrate, iron sulfate, iron phosphate, iron oxalate, nickel fluoride, nickel chloride, nickel bromide, nickel iodide, nickel acetate, nickel nitrate, nickel sulfate, nickel oxalate, nickel carbonate, and nickel cyclohexanebutyrate. In an exemplary embodiment, the suitable first metal-containing salt is iron chloride. In an exemplary embodiment, the suitable first metal-containing salt is nickel chloride.

In an exemplary embodiment, the contacting of a) occurs under conditions sufficient to dissolve the nitrogen precursor and the first metal-containing salt. In an exemplary embodiment, the contacting of a) occurs at a temperature of from about 0° C. to about 120° C., or from about 0° C. to about 100° C., or from about 10° C. to about 100° C., or from about 5° C. to about 50° C., from about 10° C. to about 30° C., or at about room temperature. In an exemplary embodiment, the contacting of a) occurs at a time of from about 1 sec to about 24 hours, or from about 1 min to about 18 hours, or from about 30 min to about 12 hours, or from about 1 hour to about 6 hours. In an exemplary embodiment, the ratio of equivalents of the nitrogen precursor to equivalents of the suitable first metal-containing salt is from about 1:1 to about 1:30, or from about 1:1 to about 1:10, or from 10:1 to about 1:1, or from 30:1 to about 1:1. In an exemplary embodiment, the ratio of equivalents of the nitrogen precursor to equivalents of the suitable first metal-containing salt is from about 1:1 to about 1:5, or from 1:1 to about 1:4, or from 1:1 to about 1:3, or from 1:1 to about 1:2.5, or from 1:1 to about 1:2.3, or from 1:1 to about 1:2.1, or from 1:1 to about 1:2, or from 1:1 to about 1:1.9, or from 1:1 to about 1:1.8, or from 1:1 to about 1:1.7, or from 1:1 to about 1:1.6, or from 1:1 to about 1:1.5, or from 1:1 to about 1:1.4, or from 1:1 to about 1:1.3, or from 1:1 to about 1:1.2, or from 1:1 to about 1:1.1, or from 1:1.2 to about 1:3.2. In an exemplary embodiment, the nitrogen precursor is a combination of two nitrogen precursors described herein, and the ratio of the first nitrogen precursor to the second nitrogen precursor is from about 1:1 to about 1:5, or from 1:1 to about 1:4, or from 1:1 to about 1:3, or from 1:1 to about 1:2.5, or from 1:1 to about 1:2.3, or from 1:1 to about 1:2.1, or from 1:1 to about 1:1, or from 1:1 to about 1:1.9, or from 1:1 to about 1:1.8, or from 1:1 to about 1:1.7, or from 1:1 to about 1:1.6, or from 1:1 to about 1:1.5, or from 1:1 to about 1:1.4, or from 1:1 to about 1:1.3, or from 1:1 to about 1:1.2, or from 1:1 to about 1:1.1, or from 1:1.2 to about 1:3.2. In an exemplary embodiment, the ratio of equivalents of the nitrogen precursor to equivalents of the suitable first metal-containing salt is from about 5:1 to about 1:1, or from 4:1 to about 1:1, or from 5:1 to about 3:1, or from 5:1 to about 4:1, or from 4:1 to about 1:1, or from 3:1 to about 1:1, or from 2.5:1 to about 1:1, or from 2.3:1 to about 1:1, or from 2.1:1 to about 1:1, or from 2:1 to about 1:1, or from 1.9:1 to about 1:1, or from 1.8:1 to about 1:1, or from 1.7:1 to about 1:1, or from 1.6:1 to about 1:1, or from 1.5:1 to about 1:1, or from 1.4:1 to about 1:1, or from 1.3:1 to about 1:1, or from 1.2:1 to about 1:1, or from 1.1:1 to about 1:1, or from 1.2:1 to about 3.2:1. In an exemplary embodiment, the nitrogen precursor is a combination of two nitrogen precursors described herein, and the ratio of the first nitrogen precursor to the second nitrogen precursor is from about 5:1 to about 1:1, or from 4:1 to about 1:1, or from 5:1 to about 3:1, or from 5:1 to about 4:1, or from 4:1 to about 1:1, or from 3:1 to about 1:1, or from 2.5:1 to about 1:1, or from 2.3:1 to about 1:1, or from 2.1:1 to about 1:1, or from 2:1 to about 1:1, or from 1.9:1 to about 1:1, or from 1.8:1 to about 1:1, or from 1.7:1 to about 1:1, or from 1.6:1 to about 1:1, or from 1.5:1 to about 1:1, or from 1.4:1 to about 1:1, or from 1.3:1 to about 1:1, or from 1.2:1 to about 1:1, or from 1.1:1 to about 1:1, or from 1.2:1 to about 3.2:1.

In an exemplary embodiment, the first nitrogen precursor is aniline. In an exemplary embodiment, the second nitrogen precursor is cyanimide. In an exemplary embodiment, the first nitrogen precursor is aniline and the second nitrogen precursor is cyanimide. In an exemplary embodiment, the first strong acid solution in a) is any one which dissolves the nitrogen precursor and the suitable first metal-containing salt. In an exemplary embodiment, the first strong acid solution is an HCl solution. In an exemplary embodiment, the first strong acid solution is an $H_2SO_4$ or $HNO_3$ solution. In an exemplary embodiment, the first strong acid solution is an HI or HBr or $HClO_4$ or $HClO_3$ solution. In an embodiment, a strong acid has a pH of less than 3, less than 2, less than 1, or less than 0.5.

In an exemplary embodiment, the oxidant is selected from the group consisting of $(NH_4)_2S_2O_8$, $H_2S_2O_8$, $H_2SO_4$, $H_2SO_5$, $N_2O$, $HNO_3$, $KNO_3$, $O_3$, $KMnO_4$, and $H_2O_2$. In an exemplary embodiment, the oxidant is $H_2O_2$. In an exemplary embodiment, the oxidant is $(NH_4)_2S_2O_8$.

In an exemplary embodiment, the contacting of b) occurs under conditions sufficient to polymerize the nitrogen precursor. In an exemplary embodiment, the contacting of b) occurs at a temperature of from about 0° C. to about 120° C., or from about 0° C. to about 100° C., or from about 10° C. to about 100° C., or from about 5° C. to about 50° C., from about 10° C. to about 30° C., or at about room temperature. In an exemplary embodiment, the contacting of b) occurs at a time of from about 1 sec to about 24 hours, or from about 1 min to about 18 hours, or from about 30 min to about 12 hours, or from about 1 hour to about 6 hours, or from about 3 hours to about 5 hours. In an exemplary embodiment, the ratio of equivalents of the oxidant to equivalents of the product of a) is from about 1:1 to about 1:10, or from 10:1 to about 1:1. In an exemplary embodiment, the solvent in b) is any one which dissolves the oxidant and the product of a). In an exemplary embodiment, the ratio of equivalents of the oxidant to equivalents of the product of a) is from about 1:1 to about 1:5, or from 1:1 to about 1:4, or from 1:1 to about 1:3, or from 1:1 to about 1:2.5, or from 1:1 to about 1:2.3, or from 1:1 to about 1:2.1, or from 1:1 to about 1:2, or from 1:1 to about 1:1.9, or from 1:1 to about 1:1.8, or from 1:1 to about 1:1.7, or from 1:1.2 to about 1:2.2, or from 1:1.3 to about 1:2, or from 1:1 to about 1:1.6, or from 1:1 to about 1:1.5, or from 1:1 to about 1:1.4, or from 1:1 to about 1:1.3, or from 1:1 to about 1:1.2, or from 1:1 to about 1:1.1, or from 1:1.2 to about 1:3.2. In an exemplary embodiment, the solvent in b) is a strong acid. In an exemplary embodiment, the solvent in b) is HCl. In an exemplary embodiment, the solvent in b) is $H_2SO_4$ or $HNO_3$. In an exemplary embodiment, the solvent in b) is HI or HBr or $HClO_4$ or $HClO_3$. In an embodiment, a strong acid has a pH of less than 3, less than 2, less than 1, or less than 0.5. In an exemplary embodiment, the contacting of b) occurs at about room temperature. In an exemplary embodiment, the contacting of b) occurs at a time of from about 3 hours to about 5 hours.

In an exemplary embodiment, the process comprises b) contacting the product of a) and an oxidant, thus forming an oxidized product, and contacting said oxidized product with a carbon support. In an exemplary embodiment, the carbon support is a carbon black selected from the group consisting of Ketjenblack EC300J, Ketjenblack EC600JD, Black Pearls 2000, Vulcan XC-72, Vulcan P, Sterling C, Norit A, Darco G-60, and activated carbon. In an exemplary embodiment, the carbon support is a carbon black, and said carbon black is an activated carbon, and the activated carbon is MV-B-1500 and MWV 295-R-03. In an exemplary embodiment, the carbon support is Ketjenblack EC300J. In an exemplary embodiment, the carbon support is MWV 295-R-03. In an exemplary embodiment, the carbon support is in an aqueous solution. In an exemplary embodiment, the aqueous solution contains an alcohol. In an exemplary embodiment, the aqueous solution contains a low molecular weight alcohol. In an exemplary embodiment, the aqueous solution contains isopropanol. In an exemplary embodiment, the contacting of said oxidized product occurs at a temperature of from about 0° C. to about 120° C., or from about 0° C. to about 100° C., or from about 10° C. to about 100° C., or from about 5° C. to about 50° C., or from about 10° C. to about 30° C., or at about room temperature, or from about 50° C. to about 100° C., or from about 60° C. to about 90° C., or from about 75° C. to about 85° C., or from about 100° C. to about 1000° C., or from about 300° C. to about 700° C., or from about 500° C. to about 1000° C., or from about 600° C. to about 900° C., or from about 600° C. to about 800° C., or from about 600° C. to about 700° C., or from about 600° C. to about 1000° C., or from about 700° C. to about 1000° C., or from about 800° C. to about 1000° C., or from about 900° C. to about 1000° C., or from about 700° C. to about 900° C., or from about 700° C. to about 800° C. In an exemplary embodiment, the contacting of said oxidized product occurs at a time of from about 1 sec to about 24 hours, or from about 1 min to about 18 hours, or from about 30 min to about 12 hours, or from about 1 hour to about 6 hours, or from about 3 hours to about 5 hours, or from about 2 hours to about 4 hours. In an exemplary embodiment, the ratio of equivalents of the carbon support to equivalents of the oxidized product is from about 1:1 to about 1:10, or from 10:1 to about 1:1. In an exemplary embodiment, the ratio of equivalents of the carbon support to equivalents of the oxidized product is from about 1:1 to about 1:5, or from 1:1 to about 1:4, or from 1:1 to about 1:3, or from 1:1 to about 1:2.5, or from 1:1 to about 1:2.3, or from 1:1 to about 1:2.1, or from 1:1 to about 1:2, or from 1:1 to about 1:1.9, or from 1:1 to about 1:1.8, or from 1:1 to about 1:1.7, or from 1:1.2 to about 1:2.2, or from 1:1.3 to about 1:2, or from 1:1 to about 1:1.6, or from 1:1 to about 1:1.5, or from 1:1 to about 1:1.4, or from 1:1 to about 1:1.3, or from 1:1 to about 1:1.2, or from 1:1 to about 1:1.1, or from 1:1.2 to about 1:3.2. In an exemplary embodiment, the contacting of b) occurs at a temperature of from about 60° C. to about 90° C. In an exemplary embodiment, the contacting of b) occurs at a time of from about 2 hours to about 4 hours.

In an exemplary embodiment, the contacting of c) occurs under conditions sufficient to form the nitrogen-doped carbon adsorbent. In an exemplary embodiment, the contacting of c) occurs at a first temperature which essentially removes the solvent from the previous step, and then at a second temperature which forms the nitrogen-doped carbon adsorbent. In an exemplary embodiment, the heating in c) occurs at a temperature of from about 0° C. to about 1000° C., or from about 0° C. to about 1200° C., or from about 500° C. to about 1200° C., or from about 500° C. to about 1100° C., or from about 100° C. to about 1000° C., or from about 300° C. to about 700° C., or from about 500° C. to about 1000° C., or from about 600° C. to about 900° C., or from about 600° C. to about 800° C., or from about 600° C. to about 700° C., or from about 600° C. to about 1000° C., or from about 700° C. to about 1000° C., or from about 800° C. to about 1000° C., or from about 900° C. to about 1000° C., or from about 700° C. to about 900° C., or from about 700° C. to about 800° C. In an exemplary embodiment, the heating in c) occurs at a time of from about 1 sec to about 24 hours, or from about 1 min to about 18 hours, or from about 30 min to about 12 hours, or from about 1 hour to about 6 hours, or from about 3 hours to about 5 hours, or from about 2 hours to about 4 hours, or from about 1 min to about 2 hours, or from about 30 min to about 90 min, or from about 45 min to about 75 min, or about 60 min. In an exemplary embodiment, the heating of c) occurs in an inert atmosphere. For example, the inert atmosphere does not comprise oxygen. In one embodiment, the inert atmosphere is an inert gas, such as nitrogen or argon. In an exemplary embodiment, the heating of c) occurs in a nitrogen atmosphere. In an exemplary embodiment, the heating of c) occurs at a first temperature and for a time which essentially evaporates the solvent, and then a second temperature for producing the nitrogen-doped carbon adsorbent. In an exemplary embodiment, the heating of c) occurs at a first temperature of from about 20° C. to about 120° C., and then occurs at a second temperature of from about 500° C. to about 1000° C. In an exemplary embodiment, the heating of c) occurs at a first temperature of from about 20° C. to about 100° C. and for a time in which the solvent essentially evaporates, and then occurs at a second temperature of from about 500° C. to about 1000° C. In an exemplary embodiment, the heating of c) occurs at a first temperature of from about 35° C. to about 100° C., and then occurs at a second temperature of from about 500° C. to about 1000° C. In an exemplary embodiment, the heating in c) occurs at a time of from about 1 hour to about 6 hours and at a temperature of from about 700° C. to about 1100° C. In an exemplary embodiment, the heating in c) occurs at a time of from about 2 hours to about 4 hours and at a temperature of from about 800° C. to about 1000° C. In an exemplary embodiment, the heating in c) occurs at a time of from about 2 hours to about 4 hours and at a temperature of from about 850° C. to about 950° C.

In an exemplary embodiment, the nitrogen-doped carbon adsorbent is produced by a process further comprising d) contacting the product of c) with a second strong acid solution. In an exemplary embodiment, the nitrogen-doped carbon adsorbent is produced by a process further comprising d) contacting the product of c) with a second strong acid solution, followed by washing with water. In an exemplary embodiment, the contacting of d) occurs at a temperature of from about 0° C. to about 120° C., or from about 0° C. to about 100° C., or from about 50° C. to about 100° C., or from about 60° C. to about 90° C., or from about 75° C. to about 85° C. In an exemplary embodiment, the contacting of d) occurs at a time of from about 1 sec to about 24 hours, or from about 1 min to about 18 hours, or from about 30 min to about 12 hours, or from about 1 hour to about 6 hours, or from about 6 hours to about 12 hours, or from about 6 hours to about 10 hours, or from about 7 hours to about 9 hours. In an exemplary embodiment, the second strong acid solution in d) is any one which dissolves the product of c). In an exemplary embodiment, the second strong acid solution is an $H_2SO_4$ solution. In an exemplary embodiment, the second strong acid solution is an $HNO_3$ solution. In an exemplary embodiment, the second strong acid solution is an HI or HBr or $HClO_4$ or $HClO_3$ solution. In an embodiment, a strong acid has a pH of less than 3, less than 2, less than 1, or less than 0.5. In an exemplary embodiment, the water used in the washing step for d) is deionized water. In an exemplary embodiment, the contacting of d) occurs at a time of from about 6 hours to about 12 hours and at a temperature of from about 60° C. to about 100° C. In an exemplary embodiment, the contacting of d) occurs at a time of from about 6 hours to about 10 hours and at a temperature of from about 70° C. to about 90° C. In an exemplary embodiment, the contacting of d) occurs at a time of from about 7 hours to about 9 hours and at a temperature of from about 75° C. to about 85° C.

In an exemplary embodiment, the nitrogen-doped carbon adsorbent is produced by a process further comprising e) heating the product of d). In an exemplary embodiment, the heating in e) occurs at a temperature of from about 0° C. to about 1000° C., or from about 0° C. to about 1200° C., or from about 500° C. to about 1200° C., or from about 500° C. to about 1100° C., or from about 100° C. to about 1000° C., or from about 300° C. to about 700° C., or from about 400° C. to about 700° C., or from about 500° C. to about 700° C., or from about 550° C. to about 650° C., or from about 500° C. to about 1000° C., or from about 600° C. to about 900° C., or from about 600° C. to about 800° C., or from about 600° C. to about 700° C., or from about 600° C. to about 1000° C., or from about 700° C. to about 1000° C., or from about 800° C. to about 1000° C., or from about 900° C. to about 1000° C., or from about 700° C. to about 900° C., or from about 700° C. to about 800° C. In an exemplary embodiment, the heating in e) occurs at a time of from about 1 sec to about 24 hours, or from about 1 min to about 18 hours, or from about 30 min to about 12 hours, or from about 1 hour to about 6 hours, or from about 3 hours to about 5 hours, or from about 2 hours to about 4 hours, or from about 1 min to about 2 hours, or from about 30 min to about 90 min, or from about 45 min to about 75 min, or about 60 min, or from about 5 min to about 60 min, or from about 15 min to about 45 min, or about 30 min. In an exemplary embodiment, the heating of e) occurs in an inert atmosphere. For example, the inert atmosphere does not comprise oxygen. In one embodiment, the inert atmosphere is an inert gas, such as nitrogen or argon. In an exemplary embodiment, the heating of e) occurs in a nitrogen atmosphere.

In an exemplary embodiment, the nitrogen-doped carbon adsorbent is produced by a process comprising:
  a) contacting two nitrogen precursors and a suitable first metal-containing salt in a first strong acid solution;
  b) contacting the product of a) and an oxidant;
  c) heating the product of b);
  d) contacting the product of c) with a second strong acid solution;
  e) heating the product of d),
thereby producing the nitrogen-doped carbon adsorbent.

In an exemplary embodiment, the nitrogen-doped carbon adsorbent is produced by a process comprising:
  a) contacting two nitrogen precursors and a suitable first metal-containing salt in a first strong acid solution, wherein the two nitrogen precursors are aniline and cyanimide and the first metal-containing salt is iron chloride or nickel chloride, and the first strong acid solution is an HCl solution;
  b) contacting the product of a) and $(NH_4)_2S_2O_8$, thus forming an oxidized product, and contacting said oxidized product with an aqueous solution containing carbon black and a low molecular weight alcohol;
  c) heating the product of b) to a first temperature of from about 35° C. to about 100° C., and then to a second temperature of from about 500° C. to about 1000° C.;
  d) contacting the product of c) with either an $H_2SO_4$ solution or a $HNO_3$ solution;
  e) heating the product of d) from about 500° C. to about 1000° C.,
thereby producing the nitrogen-doped carbon adsorbent.

In an exemplary embodiment, the nitrogen-doped carbon adsorbent is produced by a process comprising:
  a) contacting two nitrogen precursors and a suitable first metal-containing salt in a first strong acid solution, wherein the two nitrogen precursors are aniline and cyanimide and the first metal-containing salt is iron chloride or nickel chloride, and the first strong acid solution is an HCl solution;
  b) contacting the product of a) and $(NH_4)_2S_2O_8$, thus forming an oxidized product, and contacting said oxidized product with an aqueous solution containing Ketjenblack EC300J and/or MWV 295-R-03 and isopropanol;
  c) heating the product of b) to a first temperature of from about 35° C. to about 100° C., and then to a second temperature of from about 500° C. to about 1000° C.;
  d) contacting the product of c) with either an $H_2SO_4$ solution or a $HNO_3$ solution;
  e) heating the product of d) from about 500° C. to about 1000° C., thereby producing the nitrogen-doped carbon adsorbent.

IIIc. Metal Nanoparticle-Deposited, Nitrogen-Doped Carbon Adsorbents

In an exemplary embodiment, the adsorbent comprises a metal nanoparticle-deposited, nitrogen-doped carbon adsorbent. In an exemplary embodiment, the adsorbent is a metal nanoparticle-deposited, nitrogen-doped carbon adsorbent. In an exemplary embodiment, the adsorbent is a gold nanoparticle-deposited, nitrogen-doped carbon adsorbent. In an exemplary embodiment, the adsorbent is prepared by a process described herein. In an exemplary embodiment, the adsorbent is prepared by a process found in the Examples. The adsorbents of the present invention can have any adsorbent structure including amorphous, crystalline, and mixtures thereof.

IIId. Synthesis of Metal Nanoparticle-Deposited, Nitrogen-Doped Carbon Adsorbents In an exemplary embodiment, the metal nanoparticle-deposited, nitrogen-doped carbon adsorbent is produced by a process comprising:
 f) contacting a nitrogen-doped carbon adsorbent with a second metal-containing salt; wherein said f) does not comprise a reducing agent.

In an exemplary embodiment, the second metal in the suitable second metal-containing salt is of periodic table Group 9-12. In an exemplary embodiment, the second metal is selected from the group consisting of Zn, Cu, Ag, Au, Hg, Pd, Pt, Co, and Ni. In an exemplary embodiment, the second metal is Au. In an exemplary embodiment, the second metal-containing salt is a gold chloride. In an exemplary embodiment, the second metal-containing salt is gold (III) chloride, gold (I) chloride, chlorotrimethylphosphine gold (I), or a combination thereof. In another exemplary embodiment, the second metal-containing salt is a gold nanoparticle. In another exemplary the second metal-containing salt is a dodecanethiol functionalized gold nanoparticles. In another exemplary embodiment, the second metal-containing salt is generated by reaction from gold precursors soluble in aqueous and alcoholic solvents In an exemplary embodiment, the second metal-containing salt is $HAuCl_4 \cdot 3H_2O$.

In an exemplary embodiment, the contacting of f) occurs at a temperature of from about 0° C. to about 120° C., or from about 0° C. to about 100° C., or from about 10° C. to about 100° C., or from about 5° C. to about 50° C., from about 10° C. to about 30° C., or at about room temperature. In an exemplary embodiment, the contacting of f) occurs at a time of from about 1 sec to about 24 hours, or from about 1 min to about 18 hours, or from about 30 min to about 12 hours, or from about 1 hour to about 6 hours, or from about 3 hours to about 5 hours, or from about 2 hours to about 4 hours, or from about 1 min to about 2 hours, or from about 30 min to about 90 min, or from about 45 min to about 75 min, or about 60 min, or from about 5 min to about 60 min, or from about 15 min to about 45 min, or about 30 min. In an exemplary embodiment, the ratio of equivalents of the nitrogen-doped carbon adsorbent to equivalents of the second metal-containing salt is from about 1:1 to about 1:10, or from about 1000:1 to about 1:1, or from about 100:1 to about 1:1, or from about 75:1 to about 25:1, or from about 70:1 to about 30:1, or from about 65:1 to about 35:1, or from about 60:1 to about 40:1, or from about 55:1 to about 45:1. In an exemplary embodiment, f) does not comprise a reducing agent such as a borohydride, such as sodium borohydride.

In an exemplary embodiment, the metal nanoparticle-deposited, nitrogen-doped carbon adsorbent is produced by a process comprising:
 f) contacting a nitrogen-doped carbon adsorbent with a second metal-containing salt, forming a product which is filtered and dried; wherein said f) does not comprise a reducing agent, such as a borohydride, such as sodium borohydride.

IV. The Method of Removing Sulfur Compounds from a Fuel Feed Stream

In one embodiment, the invention relates to a method for removing sulfur compounds from a hydrocarbon feed stream. The method comprises the steps of: 1) providing a first hydrocarbon feed stream, which is contaminated with sulfur compounds; and 2) passing the first hydrocarbon feed stream through a desulfurization system comprising a metal nanoparticle deposited nitrogen-doped carbon adsorbent to produce a second hydrocarbon feed stream which has substantially less sulfur compounds than the first hydrocarbon feed stream.

In some embodiments, 2) has a liquid hourly space velocity (LHSV) of about 0.01 to about 30. In some embodiments, 2) has a LHSV of about 0.1 to about 20. In some embodiments, 2) has a LHSV of about 0.3 to about 10. In some embodiments, 2) has a LHSV of about 0.5 to about 5. In some embodiments, 2) has a temperature of about 0° C. to about 200° C. In some embodiment, 2) has a temperature of about 10° C. to about 100° C. In some embodiment, 2) has a temperature of about 20° C. to about 50° C. In some embodiments, 2) has a pressure of about 0 to 20,000 kPa (0 to about 200 bar). In some embodiments, 2) has a pressure of about 0 to 2,000 kPa (0 to about 20 bar). In some embodiments, 2) has a pressure of about 0 to 200 kPa (0 to about 2 bar).

In some embodiments, the method further comprises: 3) desulfurizing and regenerating the metal nanoparticle deposited nitrogen-doped carbon adsorbent of 2) by treatment with a solvent. In some embodiments, the solvent is selected from the group consisting of aromatic solvents, oxygen-containing polar organic solvents, and nitrogen-containing polar organic solvents and mixture thereof.

In some embodiments, the solvent is an organic solvent selected from the group consisting of acetic acid, acetone, acetonitrile, benzene, benzonitrile, benzenethiol, benzyl alcohol, 1-butanol, 2-butanol, n-butanol, 2-butaone, 2-t-butyl alcohol, carbon tetrachloride, chlorobenzene, 1,2-dichlorobenzene, 1,2-difluorobenzene, chloroform, cyclohexane, 1,2-dichloroethane, diethylene glycol, diethyl ether, dimethylacetamide (DMAc), dimethyl ether diglyme (diethylene glycol dimethyl ether), 1-diethylaminoethanol, diethylformamide, 1,2-dimethoxy-ethane (glyme, DME), dimethylformamide (DMF), dimethyl sulfoxide (DMSO), dioxane, 1,4-dioxane, ethanol, ethyl acetate, ethylene dichloride, ethylene glycol, formic acid, glycerin, heptane, hexamethylphosphoramide (HMPA), hexamethylphosphorous triamide (HMPT), hexanes, isopropanol, methanol, methyl t-butyl ether (MTBE), methylene chloride, N-methyl-2-pyrrolidinone (NMP), nitromethane, pentane, petroleum ether (ligroine), 1-propanol, 2-propanol, n-propanol, pyridine, tetrahydrofuran (THF), toluene, triethyl amine, o-xylene, m-xylene, and p-xylene.

In some embodiments, the solvent is an aromatic solvent selected from the group consisting of benzene, benzonitrile, benzenethiol, benzyl alcohol, chlorobenzene, 1,2-dichlorobenzene, 1,2-difluorobenzene, hexafluorobenzene, mesitylene, nitrobenzene, phenol, pyridine, tetralin, toluene, 1,2, 4-trichlorobenzene, trifluorotoluene, and xylene. Examples of nitrogen-containing polar organic solvents include acetonitrile, benzonitrile, dimethylformamide (DMF), diethylformamide, 1-diethylaminoethanol, dimethylacetamide (DMAc), hexamethylphosphorous triamide (HMPT), hexamethylphosphoramide (HMPA), N-methyl-2-pyrrolidinone (NMP), nitromethane, pyridine, and triethyl amine.

In some embodiments, the solvent is an oxygen-containing polar organic solvent selected from the group consisting of acetic acid, acetone, benzyl alcohol, 1-butanol, 2-butanol, n-butanol, 2-butaone, 2-t-butyl alcohol, diethylene glycol, diethyl ether, dimethylacetamide (DMAc), dimethyl ether diglyme (diethylene glycol dimethyl ether), 1-diethylaminoethanol, diethylformamide, 1,2-dimethoxy-ethane (glyme, DME), dimethylformamide (DMF), dimethyl sulfoxide (DMSO), dioxane, 1,4-dioxane, ethanol, ethyl acetate, ethylene glycol, formic acid, glycerin, hexamethylphosphoramide (HMPA), hexamethylphosphorous triamide (HMPT), isopropanol, methanol, methyl t-butyl ether (MTBE), N-methyl-2-pyrrolidinone (NMP), 1-propanol, 2-propanol, n-propanol, and tetrahydrofuran (THF).

In some embodiments, 3) has a liquid hourly space velocity (LHSV) of about 0.5 to about 50. In some embodiments, 3) has a LHSV of about 1 to about 30. In some embodiments, 3) has a LHSV of about 1 to about 20. In some embodiments, 3) has a LHSV of about 1 to about 10. In some embodiments, 3) has a LHSV of about 0.5 to about 5. In some embodiments, 3) has a temperature of about 0° C. to about 200° C. In some embodiment, 3) has a temperature of about 10° C. to about 100° C. In some embodiment, 3) has a temperature of about 20° C. to about 50° C. In some embodiments, 3) has a pressure of about 0 to 20,000 kPa (0 to about 200 bar). In some embodiments, 3) has a pressure of about 0 to 2,000 kPa (0 to about 20 bar). In some embodiments, 3) has a pressure of about 0 to 200 kPa (0 to about 2 bar).

In some embodiments, the metal nanoparticle deposited nitrogen-doped carbon adsorbent regeneration of 3) is able to restore-up to about 30% of the metal nanoparticle deposited nitrogen-doped carbon adsorbent's initial adsorbent desulfurization capacity measured in method 2) under the same method conditions. In some embodiments, the metal nanoparticle deposited nitrogen-doped carbon adsorbent regeneration of 3) is able to restore to up to about 40% of the metal nanoparticle deposited nitrogen-doped carbon adsorbent's initial adsorbent desulfurization capacity. In some embodiments, the metal nanoparticle deposited nitrogen-doped carbon adsorbent regeneration of 3) is able to restore to up to about 50% of the metal nanoparticle deposited nitrogen-doped carbon adsorbent's initial adsorbent desulfurization capacity. In some embodiments, the metal nanoparticle deposited nitrogen-doped carbon adsorbent regeneration of 3) is able to restore to up to about 60% of the metal nanoparticle deposited nitrogen-doped carbon adsorbent's initial adsorbent desulfurization capacity. In some embodiments, the metal nanoparticle deposited nitrogen-doped carbon adsorbent regeneration of 3) is able to restore to up to about 65% of the metal nanoparticle deposited nitrogen-doped carbon adsorbent's initial adsorbent desulfurization capacity. In some embodiments, the metal nanoparticle deposited nitrogen-doped carbon adsorbent regeneration of 3) is able to restore to up to about 70% of the metal nanoparticle deposited nitrogen-doped carbon adsorbent's initial adsorbent desulfurization capacity. In some embodiments, the metal nanoparticle deposited nitrogen-doped carbon adsorbent regeneration of 3) is able to restore to up to about 75% of the metal nanoparticle deposited nitrogen-doped carbon adsorbent's initial adsorbent desulfurization capacity. In some embodiments, the metal nanoparticle deposited nitrogen-doped carbon adsorbent regeneration of 3) is able to restore to up to about 80% of the metal nanoparticle deposited nitrogen-doped carbon adsorbent's initial adsorbent desulfurization capacity. In some embodiments, the metal nanoparticle deposited nitrogen-doped carbon adsorbent regeneration of 3) is able to restore to up to about 90% of the metal nanoparticle deposited nitrogen-doped carbon adsorbent's initial adsorbent desulfurization capacity. In some embodiments, the metal nanoparticle deposited nitrogen-doped carbon adsorbent regeneration of 3) is able to restore to up to about 99% of the metal nanoparticle deposited nitrogen-doped carbon adsorbent's initial adsorbent desulfurization capacity.

In some embodiments, the nanoparticle deposited nitrogen-doped carbon adsorbent regeneration of 3) is regenerated multiple time with capacity restored from about 30% to about 99% measured in method b) under the same method conditions.

In some embodiments, the metal nanoparticle deposited nitrogen-doped carbon adsorbent comprises a first metal selected from the group consisting of metals of periodic table Period 4. In some embodiments, the metal nanoparticle deposited nitrogen-doped carbon adsorbent comprises a first metal selected from the group consisting of Mn, Fe, Co, Ni, Cu, and Zn. In some embodiments, the first metal is Fe or Ni.

In some embodiments, the metal nanoparticle deposited nitrogen-doped carbon adsorbent comprises a second metal selected the group consisting of metals of periodic table Group 9-12. In some embodiments, the metal nanoparticle deposited nitrogen-doped carbon adsorbent comprises a second metal selected from the group consisting of Zn, Cu, Ag, Au, Hg, Pd, Pt, Co, and Ni. In some embodiments, the second metal contained in the metal nanoparticle deposited nitrogen-doped carbon adsorbent is Au.

In some embodiments, the second metal contained in the metal nanoparticle deposited nitrogen-doped carbon adsorbent is present in an amount of about 0.01% to about 30% by weight. In some embodiments, the second metal contained in the metal nanoparticle deposited nitrogen-doped carbon adsorbent is present in an amount of about 0.1% to about 10% by weight. In some embodiments, the second metal contained in the metal nanoparticle deposited nitrogen-doped carbon adsorbent is present in an amount of about 0.3% to about 3% by weight.

In some embodiments, the metal nanoparticle deposited nitrogen-doped carbon adsorbent contains about 0.5% to about 30% by weight nitrogen. In some embodiments, the metal nanoparticle deposited nitrogen-doped carbon adsorbent contains about 1% to about 20% by weight nitrogen. In some embodiments, the metal nanoparticle deposited nitrogen-doped carbon adsorbent contains about 4% to about 10% by weight nitrogen.

In some embodiments, the metal nanoparticle deposited nitrogen-doped carbon adsorbent contains about 0.5% to about 30% by weight oxygen. In some embodiments, the metal nanoparticle deposited nitrogen-doped carbon adsorbent contains about 2% to about 20% by weight oxygen. In some embodiments, the metal nanoparticle deposited nitrogen-doped carbon adsorbent contains about 4% to about 10% by weight oxygen.

In some embodiments, the sulfur compounds are selected from compounds having a boiling point within or about the boiling point range of liquid fuel having an initial boiling point above 80° C., or preferably above 125° C. In some embodiments, the sulfur compounds are carbonyl sulfide, hydrogen sulfide, thiophene, disulfides, sulfoxides, mercaptan, higher molecular weight organic sulfur-containing compounds, and derivatives thereof. In some embodiments, the sulfur compounds are thiophene and thiophene derivatives. In some embodiments, the sulfur compounds are alkyl substituted benzothiophene and dibenzothiophene derivatives. In some embodiments, the sulfur compounds are higher molecular weight organic sulfur-containing compounds selected from the group consisting of at least 2-ring polycyclic aromatics with at least one carbon atom in the aromatic ring being replaced by one S atom. In some embodiments, the sulfur compounds comprise thiophene, benzothiophene, dibenzothiophene and their derivatives. In some embodiments, the first hydrocarbon feed stream contains aromatics with a similar aromaticity or same ring number as the thiophene and/or thiophene derivatives. In some embodiments, the thiophene derivatives are substituted and unsubstituted thiophene derivatives. In some embodiments, the thiophene derivatives are benzothiophene and dibenzothiophene derivatives optionally substituted with 1-4 groups each independently selected from the group consisting of linear or branched alkyl, heteroalkyl, cycloalkyl, heterocycloalkyl, aryl, heteroaryl, and naphthenic and hetero-naphthenic derivatives. In some embodiments, the thiophene derivatives are mono or di alkyl substituted benzothiophene and dibenzothiophenes. In some embodiments, the thiophene derivatives are 4,6-dialkyl dibenzothiophenes. In some embodiments, the thiophene derivative is benzothiophene, dibenzothiophene (DBT) or 4,6-dimethyldibenzothiophene (DMDBT). In some embodiments, the thiophene derivative is 4,6-dimethyldibenzothiophene (DMDBT).

In some embodiments, the sulfur compounds are present in the first hydrocarbon feed stream in an amount of about 1 ppm to about 500 ppm. In some embodiments, the sulfur compounds are present in the first hydrocarbon feed stream in an amount of about 5 ppm to about 200 ppm, In some embodiments, the sulfur compounds are present in the first hydrocarbon feed stream in an amount of about 10 ppm to about 100 ppm. In some embodiments, the sulfur compounds are present in the first hydrocarbon feed stream in an amount of about 10 ppm to about 50 ppm.

In some embodiments, the sulfur compounds are present in the second hydrocarbon feed stream in an amount of less than about 500 ppm. In some embodiments, the sulfur compounds are present in the second hydrocarbon feed stream in an amount of less than about 100 ppm. In some embodiments, the sulfur compounds are present in the second hydrocarbon feed stream in an amount of less than about 50 ppm. In some embodiments, the sulfur compounds are present in the second hydrocarbon feed stream in an amount of less than about 10 ppm. In some embodiments, the sulfur compounds are present in the second hydrocarbon feed stream in an amount of less than about 2 ppm. In some embodiments, the sulfur compounds are present in the second hydrocarbon feed stream in an amount of less than about 1 ppm. In some embodiments, the second hydrocarbon feed stream contains about 70% to about 99.9% by weight less sulfur compounds than the first hydrocarbon feed stream. In some embodiments, the second hydrocarbon feed stream contains about 90% to about 99.9% by weight less sulfur compounds than the first hydrocarbon feed stream.

In some embodiments, the hydrocarbon feed stream is a liquid fuel stream. In some embodiments, the hydrocarbon feed stream hydrocarbon feed stream is selected from the group consisting of diesel fuel, jet fuel, gasoline, kerosene, compressed natural gas, liquefied petroleum gas (LPG), ethanol, methanol, and butanol. In some embodiments, the hydrocarbon feed stream is diesel fuel or jet fuel.

In some embodiments, the present invention provides a method for removing thiophene and thiophene derivatives from a hydrocarbon feed stream comprising: a) providing a first hydrocarbon feed stream, which is contaminated with thiophene and thiophene derivatives; and b) passing the first hydrocarbon feed stream through a desulfurization system comprising a gold nanoparticle deposited nitrogen-doped carbon adsorbent to produce a second hydrocarbon feed stream which has substantially less thiophene and thiophene derivatives than the first hydrocarbon feed stream, wherein thiophene and thiophene derivatives are present in the first hydrocarbon feed stream in an amount of about 1 ppm to about 100 ppm and wherein the gold nanoparticle deposited nitrogen-doped carbon contains gold in an amount of about 0.1% to about 5% by weight, nitrogen in amount of about 1% to about 20% by weight nitrogen, and oxygen in an amount of about 4% to about 10% by weight.

In some embodiments, the present invention provides a method for removing benzothiophene, dibenzothiophene (DBT) and/or 4,6-dimethyldibenzothiophene (DMDBT) from a liquid fuel feed stream comprising: a) providing a first liquid fuel stream, which is contaminated with benzothiophene, DBT and/or DMDBT; and b) passing the first liquid fuel stream through a desulfurization system comprising a gold nanoparticle deposited nitrogen-doped carbon adsorbent to produce a second liquid fuel stream which has less than 1 ppm of benzothiophene, DBT and/or DMDBT, wherein benzothiophene, DBT and/or DMDBT are present in the first liquid fuel stream in an amount of about 1 ppm to about 50 ppm and wherein the gold nanoparticle deposited nitrogen-doped carbon contains gold in an amount of about 0.1% to about 5% by weight, nitrogen in amount of about 1% to about 20% by weight nitrogen, and oxygen in an amount of about 4% to about 10% by weight.

In some embodiments, the present invention provides a method for removing benzothiophene, DBT and/or 4,6-dimethyldibenzothiophene (DMDBT) from a liquid fuel feed stream comprising: a) providing a first liquid fuel stream, which is contaminated with benzothiophene, DBT and/or DMDBT; and b) passing the first liquid fuel stream through a desulfurization system comprising a gold nanoparticle deposited nitrogen-doped carbon adsorbent to produce a second liquid fuel stream which has about 90% to about 99.9% by weight less sulfur compounds than the first liquid fuel stream, wherein benzothiophene, DBT and/or DMDBT are present in the first liquid fuel stream in an amount of about 1 ppm to about 50 ppm and wherein the gold nanoparticle deposited nitrogen-doped carbon contains gold in an amount of about 0.1% to about 3% by weight, nitrogen in amount of about 1% to about 20% by weight nitrogen, and oxygen in an amount of about 4% to about 10% by weight.

In some embodiments, the present invention provides a method for removing thiophene, benzothiophene, dibenzothiophene and their derivatives from a liquid fuel feed stream comprising: a) providing a first liquid fuel stream, which is contaminated with thiophene, benzothiophene, dibenzothiophene and their derivatives; and b) contacting the first liquid fuel stream with a desulfurization adsorbent comprising a gold nanoparticle deposited nitrogen-doped carbon in a batch container for a period of time from 1 minute to 48 hours with agitation. Separation of the adsorbent from the mixture by filtration to obtain a second liquid fuel stream which has about 30% to about 99.9% by weight less sulfur compounds than the first liquid fuel stream, wherein thiophene, benzothiophene, dibenzothiophene and their derivatives are present in the first liquid fuel stream in an amount of about 1 ppm to about 100 ppm and wherein the gold nanoparticle deposited nitrogen-doped carbon contains gold in an amount of about 0.1% to about 3% by weight, nitrogen in amount of about 1% to about 20% by weight nitrogen, and oxygen in an amount of about 1% to about 10% by weight.

Examples

The following Examples illustrate the synthesis and properties of representative adsorbents of the invention. These examples are not intended, nor are they to be construed, as limiting the scope of the invention. It will be clear that the invention may be practiced otherwise than as particularly described herein. Numerous modifications and variations of the invention are possible in view of the teachings herein and, therefore, are within the scope of the invention. Suitable test methods for determining sulfur in liquid hydrocarbons is ASTM D5623-94(R 2014), Standard Test Method for Sulfur Compounds in Light Petroleum Liquids by Gas Chromatography and Sulfur Selective Detection. This test method is applicable to the determination of individual sulfur species at levels of 0.1 to 100 wt ppm. An Intertek Total S Analyzer and an Agilent GC—Sulfur Chemiluminescence Detector (SCD) were used for determination of sulfur speciation and concentration.

PANI-Based Adsorbent Synthesis: Sample A 2.5 ml aniline was added into 500 ml 2.0 M HCl solution while stirring by a magnetic bar at room temperature on a hot plate. As an iron source, 10.0 g $FeCl_3$ was added into the aniline solution. After dissolving the $FeCl_3$, 5.0 g of $(NH_4)_2S_2O_8$ (ammonium persulfate, APS) as oxidant was added into the solution to polymerize aniline. The solution was stirred at room temperature for 4 hours to allow full polymerization of aniline. 0.4 g of carbon (Ketjenblack EC300J) was ultrasonically dispersed for 3 hr in 120 ml of (water (100 ml)+isopropanol alcohol (20 ml) solution in advance, and mixed with the above dispersion containing polyaniline (PANI). The temperature of the hot plate was increased up to 80° C. and the solution was dried while stirring until it became completely dried. The subsequent heat-treatment for the obtained material was performed at 900° C. in nitrogen atmosphere for 1 hour. The heat-treated powder was ground by a mortar, and the obtained powder was subsequently acid-leached in 300 ml 0.5 M $H_2SO_4$ at 80° C. for 8 hours, and fully washed by an ample amount of deionized (DI) water. After drying at 90° C. in vacuum oven overnight, this dried powder was heat-treated again at 600° C. in nitrogen atmosphere for 30 minutes to get the final adsorbent.

PANI-Based Adsorbent Synthesis: Sample B 2.5 ml aniline was added into 500 ml 2.0 M HCl solution while stirring by a magnetic bar at room temperature on a hot plate. As an iron source, 10.0 g $FeCl_3$ was added into the aniline solution. After dissolving the $FeCl_3$, 5.0 g of $(NH_4)_2S_2O_8$ (ammonium persulfate, APS) as oxidant was added into the solution to polymerize aniline. The solution was stirred at room temperature for 4 hours to allow full polymerization of aniline. 0.4 g of carbon (Ketjenblack EC300J) was ultrasonically dispersed for 3 hr in 120 ml of (water (100 ml)+isopropanol alcohol (20 ml) solution in advance, and mixed with the above dispersion containing polyaniline (PANI). The temperature of the hot plate was increased up to 80° C., and the solution was dried while stirring until it became completely dried. The subsequent heat-treatment for the obtained material was performed at 800° C. in nitrogen atmosphere for 1 hour. The heat-treated powder was ground by a mortar, and the obtained powder was subsequently acid-leached in 300 ml 0.5 M $H_2SO_4$ at 80° C. for 8 hours, and fully washed by an ample amount of DI water. After drying at 90° C. in vacuum oven overnight, this dried powder was heat-treated again at 600° C. in nitrogen atmosphere for 30 minutes to get the final adsorbent.

PANI-Based Adsorbent Synthesis: Sample C 2.5 ml aniline was added into 500 ml 2.0 M HCl solution while stirring by a magnetic bar at room temperature on a hot plate. As an iron source, 10.0 g $FeCl_3$ was added into the aniline solution. After dissolving the $FeCl_3$, 5.0 g of $(NH_4)_2S_2O_8$ (ammonium persulfate, APS) as oxidant was added into the solution to polymerize aniline. The solution was stirred at room temperature for 4 hours to allow full polymerization of aniline. 0.4 g of carbon (Ketjenblack EC300J) was ultrasonically dispersed for 3 hr in 120 ml of (water (100 ml)+isopropanol alcohol (20 ml) solution in advance, and mixed with the above dispersion containing polyaniline (PANI). The temperature of the hot plate was increased up to 80° C., and the solution was dried while stirring until it became completely dried. The subsequent heat-treatment for the obtained material was performed at 700° C. in nitrogen atmosphere for 1 hour. The heat-treated powder was ground by a mortar, and the obtained powder was subsequently acid-leached in 300 ml 0.5 M $H_2SO_4$ at 80° C. for 8 hours, and fully washed by an ample amount of DI water. After drying at 90° C. in vacuum oven overnight, this dried powder was heat-treated again at 600° C. in nitrogen atmosphere for 30 minutes to get the final adsorbent.

PANI-Based Adsorbent Synthesis: Sample E 2.5 ml aniline was added into 500 ml 2.0 M HCl solution while stirring by a magnetic bar at room temperature on a hot plate. As an iron source, 10.0 g $FeCl_3$ was added into the aniline solution. After dissolving the $FeCl_3$, 6 ml of 30% $H_2O_2$ as oxidant was added into the solution to polymerize aniline. The solution was stirred at room temperature for 4 hours to allow full polymerization of aniline. 0.4 g of carbon (Ketjenblack EC300J) was ultrasonically dispersed for 3 hr in 120 ml of (water (100 ml)+isopropanol alcohol (20 ml) solution in advance, and mixed with the above dispersion containing polyaniline (PANI). The temperature of the hot plate was increased up to 80° C., and the solution was dried while stirring until it became completely dried. The subsequent heat-treatment for the obtained material was performed at 900° C. in nitrogen atmosphere for 1 hour. The heat-treated powder was ground by a mortar, and the obtained powder was subsequently acid-leached in 300 ml 0.5 M $H_2SO_4$ at 80° C. for 8 hours, and fully washed by an ample amount of DI water. After drying at 90° C. in vacuum oven overnight, this dried powder was heat-treated again at 600° C. in nitrogen atmosphere for 30 minutes to get the final adsorbent.

PANI-Based Adsorbent Synthesis: Sample F 2.5 ml aniline was added into 500 ml 2.0 M HCl solution while stirring by a magnetic bar at room temperature on a hot plate. As an iron source, 10.0 g $FeCl_3$ was added into the aniline solution. After dissolving the $FeCl_3$, 5.0 g of $(NH_4)_2S_2O_8$ (ammonium persulfate, APS) as oxidant was added into the solution to polymerize aniline. The solution was stirred at room temperature for 4 hours to allow full polymerization of aniline. 0.4 g of carbon (Ketjenblack EC300J) was ultrasonically dispersed for 3 hr in 120 ml of (water (100 ml)+isopropanol alcohol (20 ml) solution in advance, and mixed with the above dispersion containing polyaniline (PANI). The temperature of the hot plate was increased up to 80° C., and the solution was dried while stirring until it became completely dried. The subsequent heat-treatment for the obtained material was performed at 750° C. in nitrogen atmosphere for 1 hour. The heat-treated powder was ground by a mortar, and the obtained powder was subsequently acid-leached in 300 ml 0.5 M $H_2SO_4$ at 80° C. for 8 hours, and fully washed by an ample amount of DI water. After drying at 90° C. in vacuum oven overnight, this dried powder was heat-treated again at 600° C. in nitrogen atmosphere for 30 minutes to get the final adsorbent.

PANI-Based Adsorbent Synthesis: Sample G 2.5 ml aniline was added into 500 ml 2.0 M HCl solution while stirring by a magnetic bar at room temperature on a hot plate. As an iron source, 10.0 g $FeCl_3$ was added into the aniline solution. After dissolving the $FeCl_3$, 5.0 g of $(NH_4)_2S_2O_8$ (ammonium persulfate, APS) as oxidant was added into the solution to polymerize aniline. The solution was stirred at room temperature for 4 hours to allow full polymerization of aniline. 0.4 g of carbon (Ketjenblack EC300J) was ultrasonically dispersed for 3 hr in 120 ml of (water (100 ml)+isopropanol alcohol (20 ml) solution in advance, and mixed with the above dispersion containing polyaniline (PANI). The temperature of the hot plate was increased up to 80° C., and the solution was dried while stirring until it became completely dried. The subsequent heat-treatment for the obtained material was performed at 850° C. in nitrogen atmosphere for 1 hour. The heat-treated powder was ground by a mortar, and the obtained powder was subsequently acid-leached in 300 ml 0.5 M $H_2SO_4$ at 80° C. for 8 hours, and fully washed by ample of DI water. After drying at 90° C. in vacuum oven overnight, this dried powder was heat-treated again at 600° C. in nitrogen atmosphere for 30 minutes to get the final adsorbent.

Cyanamide (CM)+Polyaniline (PANI)-Based Adsorbent Synthesis: Sample D 3.0 ml aniline was added into 500 ml 2.0 M HCl solution while stirring by a magnetic bar at room temperature on a hot plate. 7.0 g of cyanamide (CM) was added into this aniline solution. As an iron source, 10.0 g $FeCl_3$ was added into the (aniline+cyanamide) solution. After dissolving the $FeCl_3$, 5.0 g of $(NH_4)_2S_2O_8$ (ammonium persulfate, APS) as oxidant was added into the solution to polymerize aniline. The solution was stirred at room temperature for 4 hours to allow full polymerization of aniline. 0.4 g of carbon (Ketjenblack EC300J) was ultrasonically dispersed for 3 hr in 120 ml of (water (100 ml)+isopropanol alcohol (20 ml) solution in advance, and mixed with the above dispersion containing cyanamide (CM) and polyaniline (PANI). The temperature of the hot plate was increased up to 80° C., and the solution was dried while stirring until it became a tar-like state. The subsequent heat-treatment for the obtained material was performed at 900° C. in nitrogen atmosphere for 1 hour. The heat-treated powder was ground by a mortar, and the obtained powder was subsequently acid-leached in 300 ml 0.5 M $H_2SO_4$ at 80° C. for 8 hours, and fully washed by an ample amount of DI water. After drying at 90° C. in vacuum oven overnight, this dried powder was heat-treated again at 600° C. in nitrogen atmosphere for 30 minutes to get the final adsorbent.

(CM+PANI)-Based Adsorbent Synthesis: Sample H 3.0 ml aniline was added into 500 ml 2.0 M HCl solution while stirring by a magnetic bar at room temperature on a hot plate. 7.0 g of cyanamide (CM) was added into this aniline solution. As an iron source, 14.7 g $NiCl_3 \cdot 6H_2O$ was added into the (aniline+cyanamide) solution. After dissolving the $NiCl_3 \cdot 6H_2O$, 5.0 g of $(NH_4)_2S_2O_8$ (ammonium persulfate, APS) as oxidant was added into the solution to polymerize aniline. The solution was stirred at room temperature for 4 hours to allow full polymerization of aniline. 0.4 g of carbon (Ketjenblack EC300J) was ultrasonically dispersed for 3 hr in 120 ml of (water (100 ml)+isopropanol alcohol (20 ml) solution in advance, and mixed with the above dispersion containing cyanamide (CM) and polyaniline (PANI). The temperature of the hot plate was increased up to 80° C., and the solution was dried while stirring until it became a tar-like state. The subsequent heat-treatment for the obtained material was performed at 900° C. in nitrogen atmosphere for 1 hour. The heat-treated powder was ground by a mortar, and the obtained powder was subsequently acid-leached in 300 ml 0.5 M $H_2SO_4$ at 80° C. for 8 hours, and fully washed by an ample amount of deionized (DI) water. After drying at 90° C. in vacuum oven overnight, this dried powder was heat-treated again at 600° C. in nitrogen atmosphere for 30 minutes to get the final adsorbent.

(CM+PANI)-Based Adsorbent Synthesis: Sample I 3.0 ml aniline was added into 500 ml 2.0 M HCl solution while stirring by a magnetic bar at room temperature on a hot plate. 7.0 g of cyanamide (CM) was added into this aniline solution. As an iron source, 14.7 g $NiCl_3 \cdot 6H_2O$ was added into the (aniline+cyanamide) solution. After dissolving the $NiCl_3 \cdot 6H_2O$, 5.0 g of $(NH_4)_2S_2O_8$ (ammonium persulfate, APS) as oxidant was added into the solution to polymerize aniline. The solution was stirred at room temperature for 4 hours to allow full polymerization of aniline. 0.4 g of carbon (Ketjenblack EC300J) was ultrasonically dispersed for 3 hr in 120 ml of (water (100 ml)+isopropanol alcohol (20 ml) solution in advance, and mixed with the above dispersion containing cyanamide and polyaniline (PANI). The temperature of the hot plate was increased up to 80° C., and the solution was dried while stirring until it became a tar-like state. The subsequent heat-treatment for the obtained material was performed at 900° C. in nitrogen atmosphere for 1 hour. The heat-treated powder was ground by a mortar, and the obtained powder was subsequently acid-leached in 300 ml 3.0 M $HNO_3$ at 80° C. for 8 hours, and fully washed by an ample amount of DI water. After drying at 90° C. in vacuum oven overnight, this dried powder was heat-treated again at 600° C. in nitrogen atmosphere for 30 minutes to get the final adsorbent.

(CM+PANI)-Based Adsorbent Synthesis: Sample J 3.0 ml aniline was added into 500 ml 2.0 M HCl solution while stirring by a magnetic bar at room temperature on a hot plate. 7.0 g of cyanamide (CM) was added into this aniline solution. As an iron source, 10.0 g $FeCl_3$ was added into the (aniline+cyanamide) solution. After dissolving the $FeCl_3$, 5.0 g of $(NH_4)_2S_2O_8$ (ammonium persulfate, APS) as oxidant was added into the solution to polymerize aniline. The solution was stirred at room temperature for 4 hours to allow full polymerization of aniline. 0.4 g of carbon (Ketjenblack EC300J) was ultrasonically dispersed for 3 hr in 120 ml of (water (100 ml)+isopropanol alcohol (20 ml) solution in advance, and mixed with the above dispersion containing cyanamide (CM) and polyaniline (PANI). The temperature of the hot plate was increased up to 80° C., and the solution was dried while stirring until it became a tar-like state. The subsequent heat-treatment for the obtained material was performed at 800° C. in nitrogen atmosphere for 30 minutes. The heat-treated powder was ground by a mortar, and the obtained powder was subsequently acid-leached in 300 ml 0.5 M $H_2SO_4$ at 80° C. for 8 hours, and fully washed by ample of DI water. After drying at 90° C. in vacuum oven overnight, this dried powder was heat-treated again at 500° C. in nitrogen atmosphere for 30 minutes to get the final adsorbent.

(CM+PANI)-Based Adsorbent Synthesis: Sample L

Au deposition was done on Sample J with a reducing agent, sodium borohydride (NaBH$_4$), to make 1 wt % Au deposition. 2.5 g of Sample J was sonicated in 500 ml DI water for 1 hour. 0.0505 g of HAuCl$_4$·3H$_2$O was dissolved in 100 ml DI water. Both of these solutions were mixed together and stirred for 2 hours. 0.2 g of NaBH$_4$ was added to the mixture and stirred for an additional 2 hours. The resulting stirred mixture was filtered using a 0.45 micrometer membrane filter and dried in a vacuum oven at 90° C. overnight.

Sample M

WV-B-1500 was modified by ammonia (NH$_3$) at 900° C. for 20 minutes.

Sample N

WV-B-1500 was modified by 3.0 M HNO$_3$ at 80° C. for 8 hours and ammonia (NH$_3$) at 900° C. for 20 minutes.

(CM+PANI)-Based Adsorbent Synthesis: Sample P 3.0 ml aniline was added into 500 ml 2.0 M HCl solution while stirring by a magnetic bar at room temperature on a hot plate. 7.0 g of cyanamide (CM) was added into this aniline solution. As an iron source, 10.0 g FeCl$_3$ was added into the (aniline+cyanamide) solution. After dissolving the FeCl$_3$, 5.0 g of (NH$_4$)$_2$S$_2$O$_8$ (ammonium persulfate, APS) as oxidant was added into the solution to polymerize aniline. The solution was stirred at room temperature for 4 hours to allow full polymerization of aniline. The temperature of the hot plate was increased up to 80° C., and the solution was dried while stirring until it became a tar-like state. The subsequent heat-treatment for the obtained material was performed at 800° C. in nitrogen atmosphere for 30 minutes. The heat-treated powder was ground by a mortar, and the obtained powder was subsequently acid-leached in 300 ml 0.5 M H$_2$SO$_4$ at 80° C. for 8 hours, and fully washed by an ample amount of DI water. After drying at 90° C. in vacuum oven overnight, this dried powder was heat-treated again at 500° C. in nitrogen atmosphere for 30 minutes to get the final adsorbent.

(CM+PANI)-Based Adsorbent Synthesis: Sample S 3.0 ml aniline was added into 500 ml 2.0 M HCl solution while stirring by a magnetic bar at room temperature on a hot plate. 7.0 g of cyanamide (CM) was added into this aniline solution. As an iron source, 10.0 g FeCl$_3$ was added into the (aniline+cyanamide) solution. After dissolving the FeCl$_3$, 5.0 g of (NH$_4$)$_2$S$_2$O$_8$ (ammonium persulfate, APS) as oxidant was added into the solution to polymerize aniline. The solution was stirred at room temperature for 4 hours to allow full polymerization of aniline. 0.4 g of carbon (MWV 295-R-03) was ultrasonically dispersed for 3 hr in 120 ml of (water (100 ml)+isopropanol alcohol (20 ml)) solution in advance, and mixed with the above dispersion containing cyanamide (CM) and polyaniline (PANI). The temperature of the hot plate was increased up to 80° C., and the solution was dried while stirring until it became a tar-like state. The subsequent heat-treatment for the obtained material was performed at 800° C. in nitrogen atmosphere for 30 minutes. The heat-treated powder was ground by a mortar, and the obtained powder was subsequently acid-leached in 300 ml 0.5 M H$_2$SO$_4$ at 80° C. for 8 hours, and fully washed by ample of DI water. After drying at 90° C. in vacuum oven overnight, this dried powder was heat-treated again at 500° C. in nitrogen atmosphere for 30 minutes to get the final adsorbent.

(CM+PANI)-Based Adsorbent Synthesis: Sample U

To make 1 wt % Au deposition, 2.9 g of Sample S was sonicated in 500 ml DI water for 1 hour, and separately 0.0586 g of HAuCl$_4$·3H$_2$O was dissolved in 100 ml DI water. The carbon dispersion and the HAuCl$_4$·3H$_2$O solutions were mixed together and stirred for 15 hours. Then the mixture was filtered using a 0.45 micrometer membrane filter and dried in a vacuum oven at 90° C. overnight.

Desulfurization Capacity Measurement of Adsorbents

The liquid fuel used for determining the sulfur removal capacity of adsorbents was a simulated model feedstock targeting typical compositions of liquid fuel products generated from hydroprocessing process with sulfur concentration at about 100 ppm. The composition of the simulated liquid fuel was:

| Liquid fuel for sulfur capacity measurement | Composition |
|---|---|
| Dibenzothiophene (DBT) | 50 ppmwt S |
| 4,6-dimethyl dibenzothiophene (DMDBT) | 50 ppmwt S |
| Phenathrene | 0.5 wt % |
| 2-Metylnaphethalene | 3.0 wt % |
| Hexylbenzene | 16.5 wt % |
| Hexadecane isomer mixture | ~80 wt % |

Two methods were used for measuring desulfurization capacity of adsorbents according to practical applications. The measurement of the dynamic desulfurization capacity ($C_{dyn.}$) or breakthrough desulfurization capacity of adsorbents was conducted in a plug-flow fixed bed reactor system. Adsorbent of about 1 gram was pre-dried at 120° C. overnight in a vacuum oven and then loaded into a stainless-steel tubing reactor in a dry box under dry N$_2$ atmosphere environment. The adsorbent-loaded reactor was then installed to a desulfurization capacity measurement system. The adsorption bed was activated at 100° C. for 4 hours under hydrogen flow at a rate of 100 mL/min to remove any adsorbed moisture. The simulated liquid fuel feed comprising 50 ppm wt of S in DBT and 50 ppm wt of S in DMDBT was run through the adsorption bed with a liquid delivery pump at room temperature at LHSV of 0.5 to 2.0 h$^{-1}$. The effluent liquid product was collected periodically for S analysis for DBT and DMDBT concentration. At the beginning, S concentration in the effluent of the liquid product was nearly undetectable. The S concentration in the effluent liquid gradually increased with time on stream when adsorbent is gradually saturated with DBT and DMDBT compounds. The desulfurization capacity was calculated at DBT or DMDBT breakthrough concentration of 10 ppmwt S in the effluent liquid product. The desulfurization capacity was calculated based on the amount of DBT and DMDBT removed from liquid fuel to the weight of adsorbent. In this experiment, the dynamic desulfurization capacity for DBT ($C_{dyn.DBT}$) and DMDBT ($C_{dyn.DMDBT}$) were calculated based on their concentration of 10 ppm in the effluent liquid, respectively, using the equation below.

$$C_{(dyn.\ DBT)} = W_{feed} * S_{DBT} / W_{adsorbent} * 100\%$$

$$C_{(dyn.\ DMDBT)} = W_{feed} * S_{DMDBT} / W_{adsorbent} * 100\%$$

In which $W_{feed}$: weight of testing feed in contact with the adsorbent, grams $S_{DBT}$: 50 ppm S of DBT in the testing feed minus S of DBT in effluent, grams (S concentration is converted from ppm to grams)

$S_{DMDBT}$: 50 ppm S of DMDBT in the testing feed minus S of DMDBT in effluent, grams (S concentration is converted from ppm to grams)

$W_{adsorbent}$: weight of adsorbent in the testing adsorber bed

The measurement of equilibrium desulfurization capacity, hereafter named the percentage of S removed ($R_{equi.}$) was conducted in a flask equipped with agitation. Adsorbent of about 0.1 gram pre-dried at 120° C. overnight in a vacuum oven was loaded to the flask in a dry box under dry $N_2$ atmosphere environment. About 10 mL of the simulated liquid fuel comprising 50 ppm DBT and 50 ppm DMDBT was added to the flask according to the ratio of adsorbent to liquid fuel ratio of 1 to 100 by weight. The mixture was agitated at room temperature for 16 hours. Then the liquid fuel was taken from the mixture for DBT and DMDBT analysis. The equilibrium desulfurization capacity for DBT ($R_{equi.DBT}$) and for DMDBT ($R_{equi.DMDBT}$) is calculated based on the percentage of DBT and DMDBT removed after in contact with the adsorbents.

$$R_{(equi\ DBT)} = \frac{50 ppm\ S\ of\ DBT - ppm\ S\ of\ DBT}{50 ppm\ S\ of\ DBT} \times 100\%$$

$$R_{(equi\ DMDBT)} = \frac{50 ppm\ of\ DMDBT - ppm\ S\ of\ DMDBT}{50 ppm\ S\ of\ DMDBT} \times 100\%$$

In which ppm S of DBT or DMDBT is S in liquid after in contact with adsorbents

Regeneration of Adsorbents

The adsorbent after the dynamic desulfurization capacity measurement was regenerated by toluene solvent with over 95% desulfurization capacity restored. In one embodiment, when S concentration in the effluent liquid reached 10 ppm of combined DBT and DMDBT in a dynamic desulfurization capacity measurement, the simulated liquid fuel feed was replaced by toluene solvent to regenerate the adsorbent by running through toluene solvent to the adsorbent reactor for 2 hours at LHSV of 5 $h^{-1}$. The toluene solvent pump was then stopped. Hydrogen gas of 100 mL/min was flowed through the reactor to flush out any residue liquid and to dry the adsorbent at room temperature. The adsorbent was then further dried in-situ at 100° C. for 4 hours under the hydrogen flow and then cooled down to room temperature for dynamic desulfurization capacity measurement for the regenerated adsorbent. In one embodiment, over 95% desulfurization capacity was restored. In one embodiment, the regeneration of adsorbent was repeated for 10 times and, each time, over 95% desulfurization capacity was restored.

Samples A, B, C, E, F, and G were synthesized to study impacts of synthetic conditions on the desulfurization capacity of metal nanoparticle deposited nitrogen-doped carbon adsorbent (or metal/carbon nanocomposites). It showed that desulfurization capacity reflected by $C_{dyn.}$ and $R_{equi.}$ depended on the chemicals used and the heat treatment temperature.

Samples D, H, I, J, and K were synthesised using aniline and cyanamide as nitrogen precursors. For samples J and K, the first and second heat treatment temperatures were lowered to 800 and 500° C., respectively, in comparison with samples D, H and I. Sample I used nitric acid for leaching instead of sulfuric acid.

Samples M and N suggested that N insertion into activated carbon frameworks can be also be achieved by $NH_3$ treatment. Sample M showed $R_{equi}$ comparable to sample D. This approach can greatly reduce the cost of making adsorbents.

Sample P was synthesized without the use of activated carbon as a support while keeping all other synthetic conditions the same as sample J. Sample P showed excellent desulfurization activity ($C_{dyn.}$ and $R_{equi.}$). Importantly, sample P is more selective toward the steric-hindered DMDBT over DBT.

Au metal of 1 wt % was deposited on sample J for making sample L and on sample S for making sample U using $HAuCl_4$ as Au source. In the synthesis of sample L, a reducing agent, sodium borohydride, was used to reduce the deposited Au nano particles. For sample U, no reducing agent was used in the second metal depositing process. Au-deposited sample L showed a comparable desulfurization capacity to its precursor of sample J. Sample U showed greatly increased desulfurization capacity over its precursor of sample S. Interestingly, the sample U showed great affinity to steric-hindered DMDBT. In the equilibrium desulfurization study, sample U showed nearly 100% selectivity toward DMDBT.

For the purposes of this specification and appended claims, unless otherwise indicated, all numbers expressing quantities, percentages or proportions, and other numerical values used in the specification and claims, are to be understood as being modified in all instances by the term "about." Accordingly, unless indicated to the contrary, the numerical parameters set forth in the following specification and attached claims are approximations that can vary depending upon the desired properties sought to be obtained by the present invention. Furthermore, all ranges disclosed herein are inclusive of the endpoints and are independently combinable. Whenever a numerical range with a lower limit and an upper limit are disclosed, any number falling within the range is also specifically disclosed. Unless otherwise specified, all percentages are in weight percent.

It is noted that, as used in this specification and the appended claims, the singular forms "a," "an," and "the," include plural references unless expressly and unequivocally limited to one referent. As used herein, the term "include" and its grammatical variants are intended to be non-limiting, such that recitation of items in a list is not to the exclusion of other like items that can be substituted or added to the listed items.

Unless otherwise specified, the recitation of a genus of elements, materials or other components, from which an individual component or mixture of components can be selected, is intended to include all possible sub-generic combinations of the listed components and mixtures thereof.

The invention illustratively disclosed herein suitably may be practiced in the absence of any element which is not specifically disclosed herein.

This written description uses examples to disclose the invention, including the best mode, and also to enable any person skilled in the art to make and use the invention. The patentable scope is defined by the claims, and can include other examples that occur to those skilled in the art. Such other examples are intended to be within the scope of the claims if they have structural elements that do not differ from the literal language of the claims, or if they include equivalent structural elements with insubstantial differences from the literal languages of the claims. All citations referred herein are expressly incorporated herein by reference.

We claim:

1. A method for removing sulfur compounds, the method comprising:
   a) contacting at least one nitrogen precursor and a suitable first metal-containing salt in a first strong acid solution;
   b) contacting a product of a) and an oxidant;
   c) heating a product of b) in an inert atmosphere;
   d) contacting a product of c) with a second strong acid solution;
   e) heating a product of d) in an inert atmosphere,
   f) contacting the product of e) with a gold containing salt to make a gold nanoparticle-deposited, nitrogen-doped carbon adsorbent;
   g) providing a first hydrocarbon feed stream, which is contaminated with the sulfur compounds; and
   h) passing the first hydrocarbon feed stream at a liquid hourly space velocity (LHSV) of $0.01\ h^{-1}$ to $30\ h^{-1}$ through a desulfurization system comprising the gold nanoparticle-deposited, nitrogen-doped carbon adsorbent at a temperature from 0° C. to 200° C. and a pressure from 0 bar to 200 bar, to produce a second hydrocarbon feed stream which has about 30% to about 99.9% by weight less of the sulfur compounds than the first hydrocarbon feed stream.

2. The method of claim 1, wherein f) does not comprise a reducing agent.

3. The method of claim 1, wherein the first hydrocarbon feed stream is a liquid hydrocarbon feed stream.

4. The method of claim 3, wherein the liquid hydrocarbon feed stream is selected from the group consisting of diesel fuel, jet fuel, gasoline, kerosene, compressed natural gas, and liquefied petroleum gas (LPG).

5. The method of claim 1, wherein the sulfur compounds comprise dibenzothiophene (DBT).

6. The method of claim 1, wherein the sulfur compounds comprise 4,6-dimethyldibenzothiophene (DMDBT).

7. The method of claim 1, wherein said c) is heating the product of b) to a first temperature of from about 35° C. to about 100° C., and then to a second temperature of from about 500° C. to about 1000° C.

8. The method of claim 1, wherein said a) is contacting two nitrogen precursors and the suitable first metal-containing salt in a first strong acid solution.

9. The method of claim 8, wherein said two nitrogen precursors are a first nitrogen precursor which is aniline and a second nitrogen precursor which is cyanimide.

10. The method of claim 1, wherein said b) is contacting the product of a) and $(NH_4)_2S_2O_8$, thus forming an oxidized product, and contacting said oxidized product with an aqueous solution containing carbon black and a low molecular weight alcohol.

11. A method for removing sulfur compounds, the method comprising:
   A) providing a first hydrocarbon feed stream, which is contaminated with the sulfur compounds; and
   B) passing the first hydrocarbon feed stream at a liquid hourly space velocity (LHSV) of $0.01\ h^{-1}$ to $30\ h^{-1}$ through a desulfurization system comprising a gold nanoparticle-deposited, nitrogen-doped carbon adsorbent at a temperature from 0° C. to 200° C. and a pressure from 0 bar to 200 bar, to produce a second hydrocarbon feed stream which has about 30% to about 99.9% by weight less of the sulfur compounds than the first hydrocarbon feed stream.

* * * * *